(12) United States Patent
Sordyl et al.

(10) Patent No.: US 8,763,405 B2
(45) Date of Patent: Jul. 1, 2014

(54) GAS TURBINE ENGINE ROTARY INJECTION SYSTEM AND METHOD

(75) Inventors: John Sordyl, Northville, MI (US); Jamey J. Condevaux, Livonia, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 932 days.

(21) Appl. No.: 12/937,197

(22) PCT Filed: Apr. 9, 2009

(86) PCT No.: PCT/US2009/040129
§ 371 (c)(1),
(2), (4) Date: Oct. 11, 2010

(87) PCT Pub. No.: WO2010/008641
PCT Pub. Date: Jan. 21, 2010

(65) Prior Publication Data
US 2011/0030381 A1 Feb. 10, 2011

Related U.S. Application Data

(60) Provisional application No. 61/043,723, filed on Apr. 9, 2008.

(51) Int. Cl.
*F02C 7/22* (2006.01)
*F02C 1/00* (2006.01)
*F23D 11/04* (2006.01)

(52) U.S. Cl.
USPC ................................ 60/776; 60/744; 431/168

(58) Field of Classification Search
USPC ................... 60/744, 743, 739, 745, 806, 776; 431/168
See application file for complete search history.

(56) References Cited

U.S. PATENT DOCUMENTS

| | | | |
|---|---|---|---|
| 903,657 A | 11/1908 | Beckmann | |
| 1,940,758 A | 12/1933 | Lehrecke | |
| 2,177,245 A | 10/1939 | Dennis | |
| 2,479,777 A | 8/1949 | Price | |
| 2,508,420 A | 5/1950 | Redding | |
| 2,518,881 A | 8/1950 | Goddard | |
| 2,595,505 A * | 5/1952 | Bachle | 60/804 |
| 2,617,252 A | 11/1952 | Klein | |
| 2,705,401 A | 4/1955 | Allen et al. | |
| 2,720,750 A | 10/1955 | Schelp | |
| 2,766,071 A | 10/1956 | Flury | |

(Continued)

OTHER PUBLICATIONS

International Search Report and Written Opinion of the International Searching Authority in International Application No. PCT/US2009/040129, Jan. 7, 2010, 12 pages.

(Continued)

*Primary Examiner* — Gerald L Sung
(74) *Attorney, Agent, or Firm* — Raggio & Dinnin, P.C.

(57) ABSTRACT

A rotary injector (95, 222) comprising one or more radially-extending arms (93) provides for injecting fuel (12, 12.1, 12.4) into a combustion chamber (16). The combustion chamber (16) receives air (14) from locations upstream and downstream of the rotary injector (95, 222), and the arms (93) of the rotary injector (95, 222) are adapted so that a pressure ($P_2$) in the combustion chamber (16) upstream of the rotary injector (95, 222) is less than a pressure ($P_0$) in a plenum (212) supplying air (14) to the combustion chamber (16) upstream of the rotary injector (95, 222).

24 Claims, 16 Drawing Sheets

(56) References Cited

U.S. PATENT DOCUMENTS

| | | | |
|---|---|---|---|
| 2,775,864 A | | 1/1957 | Karcher |
| 2,827,759 A | | 3/1958 | Bruckmann |
| 2,856,755 A | * | 10/1958 | Szydlowski ............... 60/804 |
| 2,866,313 A | | 12/1958 | Roll |
| 2,981,066 A | | 4/1961 | Johnson |
| 2,999,359 A | | 9/1961 | Frederick |
| 3,286,473 A | | 11/1966 | Cowell |
| 3,304,713 A | * | 2/1967 | Szydlowski ............... 60/745 |
| 3,307,359 A | | 3/1967 | Cowell |
| 3,321,912 A | | 5/1967 | Oprecht |
| 3,381,471 A | | 5/1968 | Szydlowski |
| 3,932,988 A | * | 1/1976 | Beaufrere ............... 60/737 |
| 4,040,251 A | | 8/1977 | Heitmann et al. |
| 4,232,526 A | * | 11/1980 | Barbeau ............... 60/745 |
| 4,429,527 A | * | 2/1984 | Teets ............... 60/776 |
| 4,769,996 A | | 9/1988 | Barbeau |
| 4,845,941 A | | 7/1989 | Paul |
| 4,870,825 A | | 10/1989 | Chapman |
| 5,003,766 A | | 4/1991 | Paul |
| 5,122,033 A | | 6/1992 | Paul |
| 5,125,793 A | | 6/1992 | MacArthur et al. |
| 5,177,954 A | | 1/1993 | Paul |
| 5,185,541 A | | 2/1993 | Jensen |
| 5,323,602 A | | 6/1994 | Defever |
| 5,341,636 A | | 8/1994 | Paul |
| 6,148,617 A | | 11/2000 | Williams |
| 6,205,770 B1 | | 3/2001 | Williams et al. |
| 6,269,647 B1 | | 8/2001 | Thompson, Jr. et al. |
| 6,351,938 B1 | | 3/2002 | Kerrebrock |
| 6,925,812 B2 | | 8/2005 | Condevaux et al. |
| 6,983,606 B2 | * | 1/2006 | Brown ............... 60/776 |
| 6,988,367 B2 | | 1/2006 | Thompson, Jr. et al. |
| 7,036,321 B2 | | 5/2006 | Dudebout et al. |
| 7,462,948 B2 | | 12/2008 | Toriyama |
| 8,057,163 B2 | | 11/2011 | Thompson, Jr. et al. |
| 2005/0039463 A1 | * | 2/2005 | Condevaux et al. ............ 60/776 |
| 2005/0229601 A1 | * | 10/2005 | Thompson et al. ............ 60/772 |
| 2007/0234733 A1 | | 10/2007 | Harris et al. |
| 2009/0019853 A1 | | 1/2009 | Nilsson |
| 2010/0212325 A1 | | 8/2010 | Condevaux et al. |
| 2011/0041509 A1 | | 2/2011 | Thompson, Jr. et al. |

OTHER PUBLICATIONS

International Preliminary Report on Patentabiliyt in International Application No. PCT/US2009/040129, Oct. 20, 2010, 7 pages.

* cited by examiner

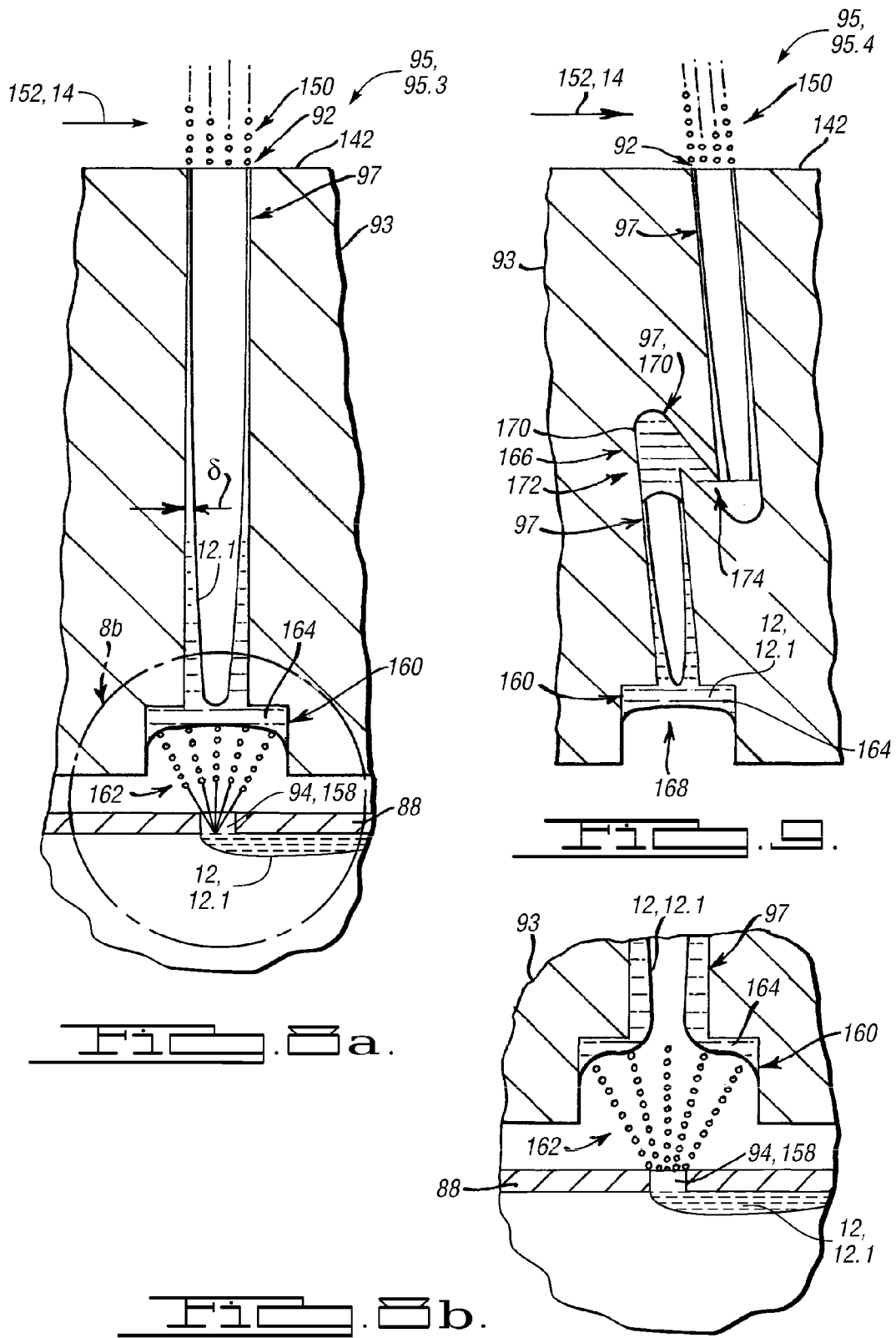

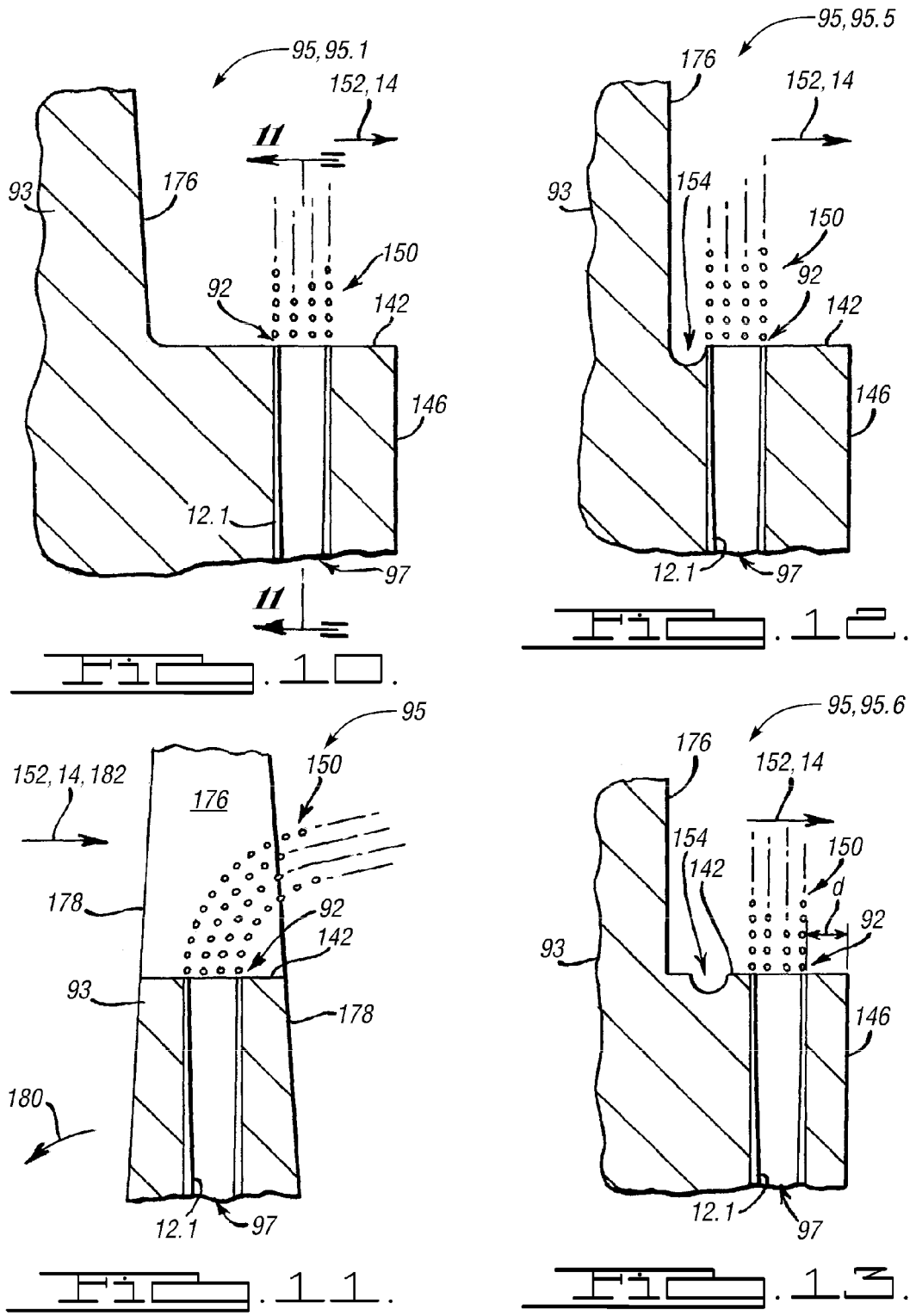

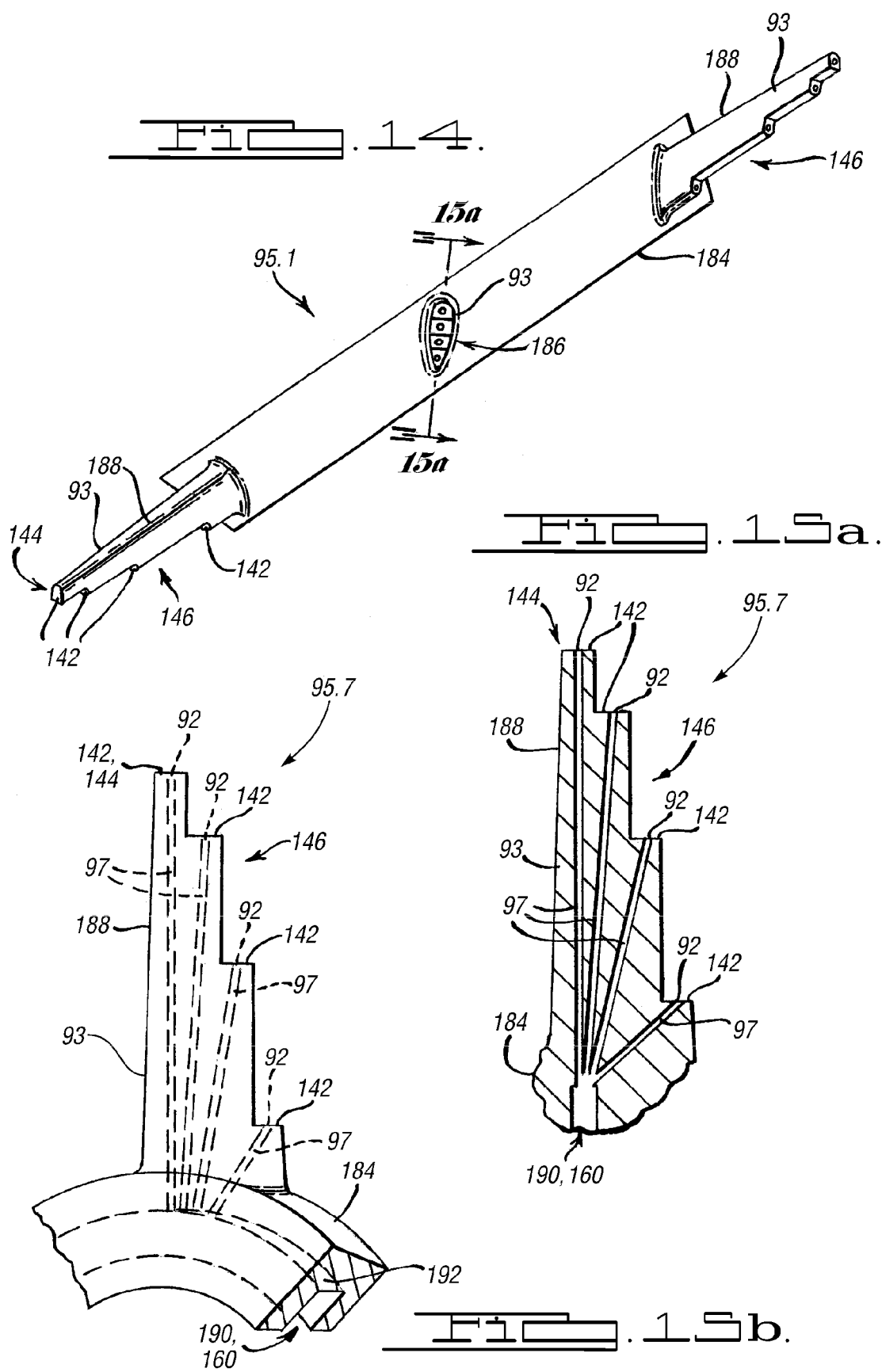

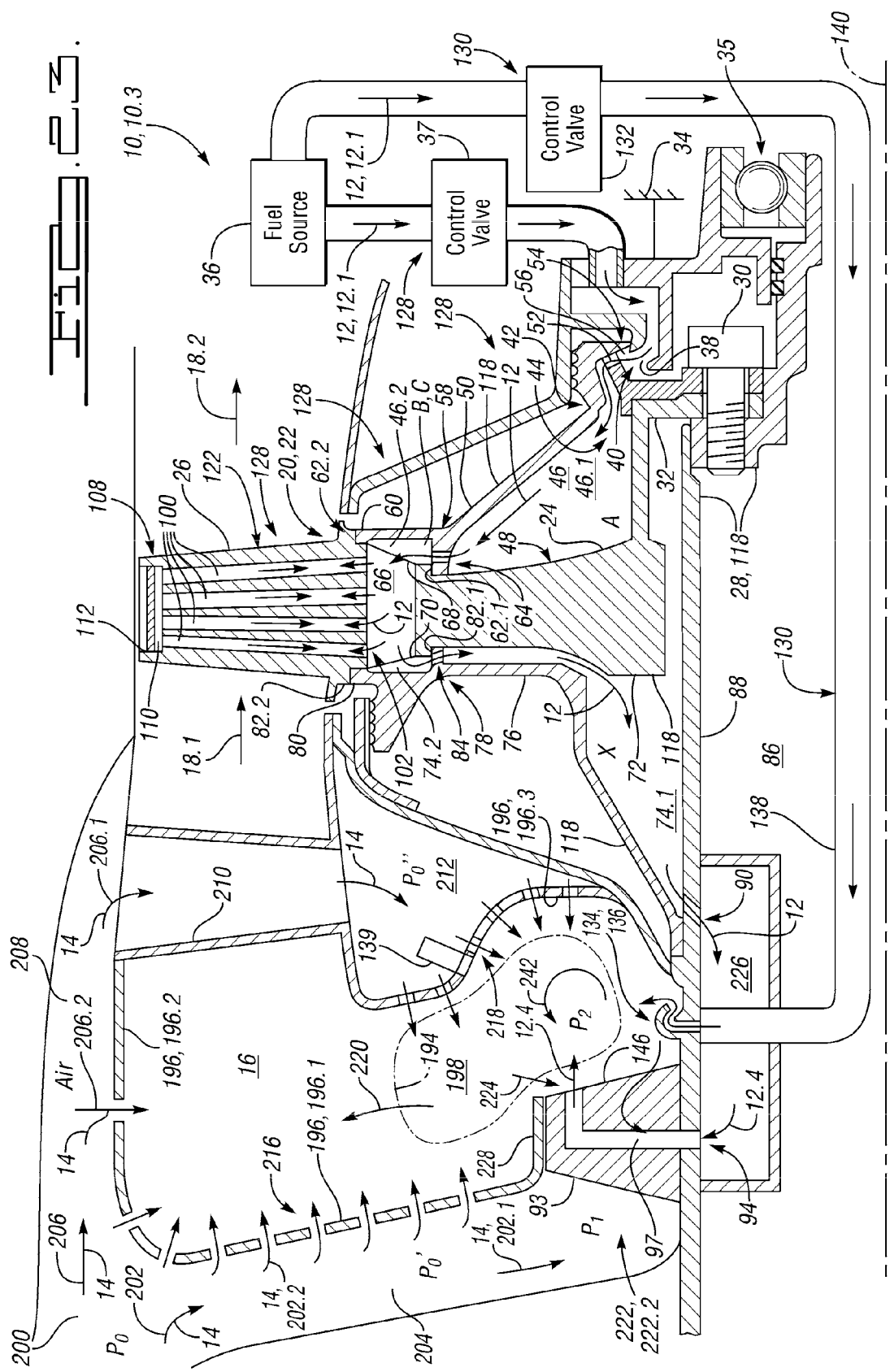

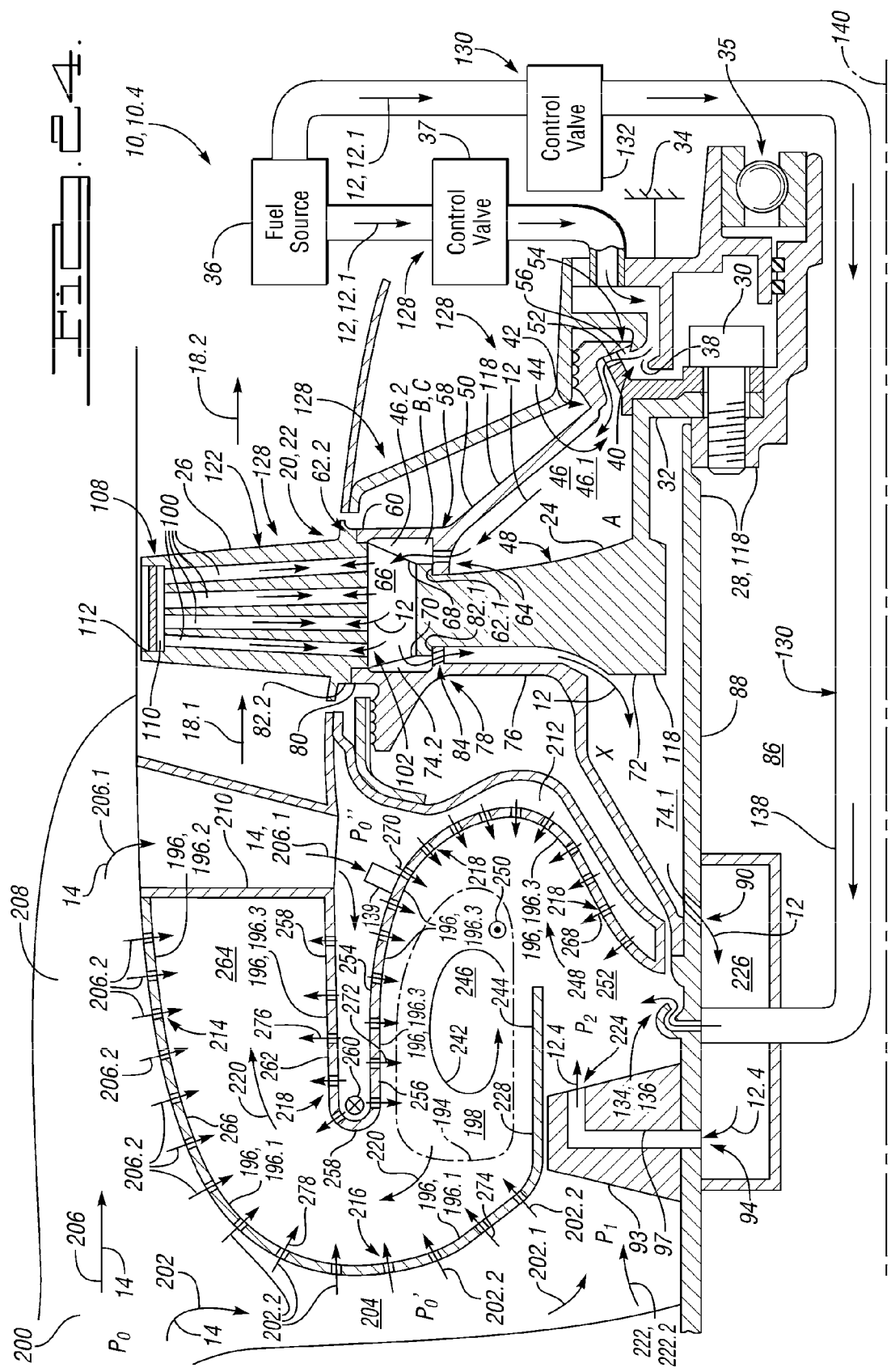

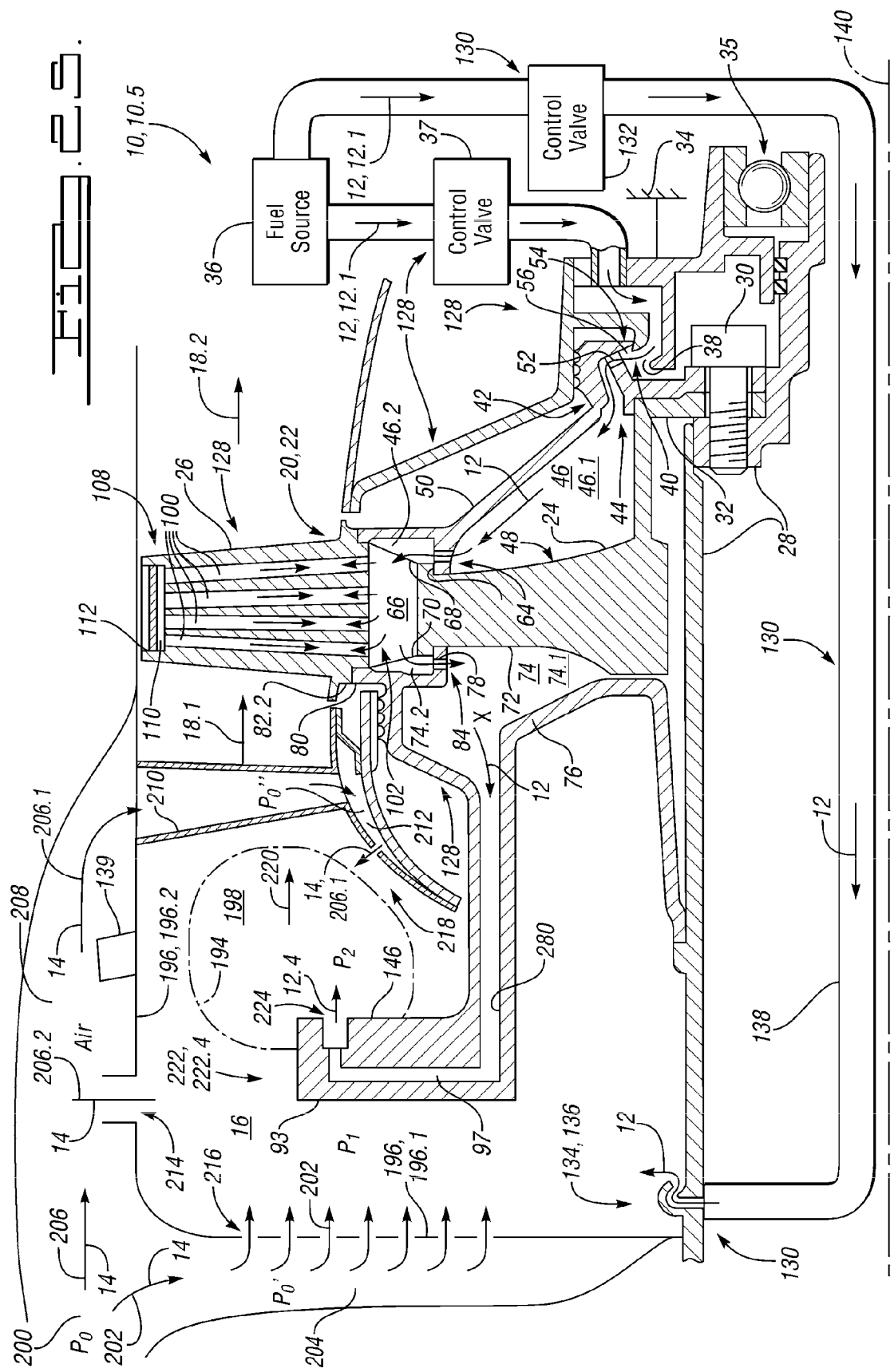

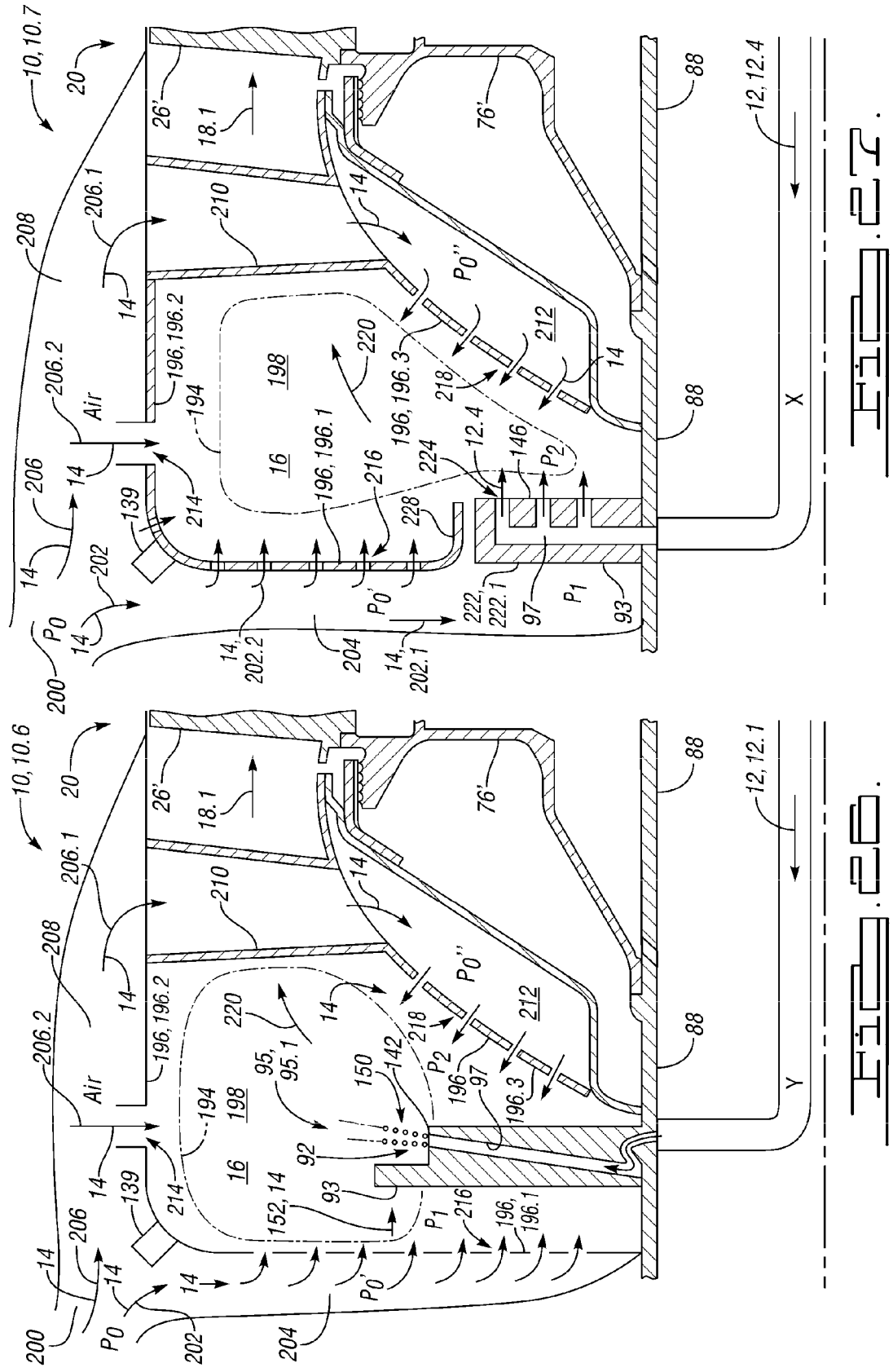

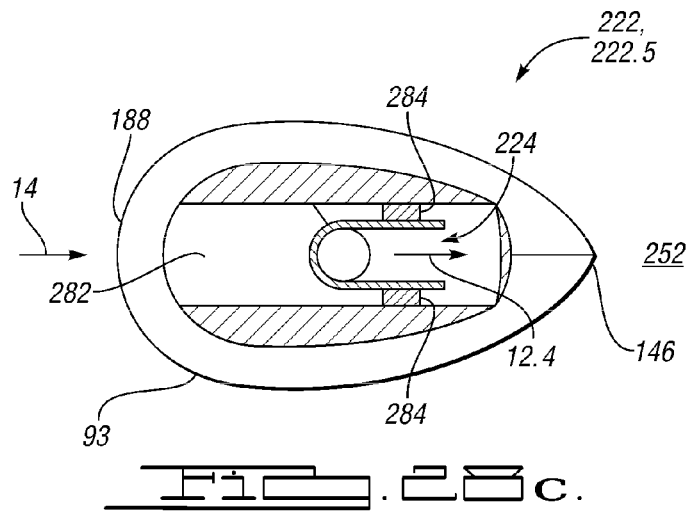
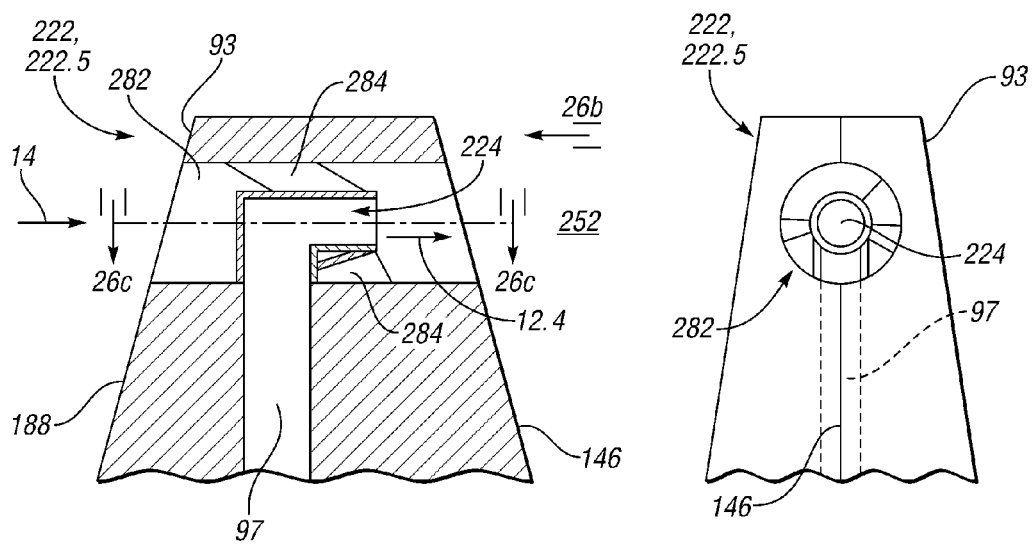
FIG.28c.
FIG.28a.  FIG.28b.

GAS TURBINE ENGINE ROTARY INJECTION SYSTEM AND METHOD

CROSS-REFERENCE TO RELATED APPLICATIONS

The instant application claims the benefit of prior U.S. Provisional Application Ser. No. 61/043,723 filed on 9 Apr. 2008, which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. F33615-03-D-2412 0004 awarded by the United States Air Force under the VAATE Program.

BRIEF DESCRIPTION OF THE DRAWINGS

In the accompanying drawings:

FIG. 8a illustrates a fragmentary cross-sectional view of a third embodiment of the first aspect of a rotary injector, in operation, wherein the flow therein is choked;

FIG. 8b illustrates a fragmentary cross-sectional view of the third embodiment of the first aspect of a rotary injector, in operation, wherein the flow therein is un-choked;

FIG. 9 illustrates a fragmentary cross-sectional view of a fourth embodiment of the first aspect of a rotary injector incorporating a rotary fluid trap, in operation;

FIG. 10 illustrates a first fragmentary cross-sectional view of the first embodiment of the first aspect of a rotary injector incorporating a first embodiment of an injector port and an associated land, in operation;

FIG. 11 illustrates a second fragmentary cross-sectional view of the first embodiment of the first aspect of a rotary injector incorporating a first embodiment of an injector port and an associated land, in operation;

FIG. 12 illustrates a fragmentary cross-sectional view of a fifth embodiment of the first aspect of a rotary injector incorporating a second embodiment of an injector port and an associated land, in operation;

FIG. 13 illustrates a fragmentary cross-sectional view of a sixth embodiment of the first aspect of a rotary injector incorporating a third embodiment of an injector port and an associated land, in operation;

FIG. 14 illustrates an edge view of a seventh embodiment of the first aspect of a rotary injector;

FIG. 15a illustrates a cross-sectional view of an arm of the seventh embodiment of the first aspect of a rotary injector illustrated in FIG. 14, illustrating a first embodiment of a fuel distribution system in the arm;

FIG. 15b illustrates a second embodiment of a fuel distribution system in an arm;

FIG. 23 illustrates a longitudinal cross-sectional view of a second embodiment of the second aspect of a gas turbine engine incorporating a system using fuel to cool the turbine and the associated blades thereof, in cooperation with a second embodiment of the second aspect of a rotary injector for injecting the resulting preheated fuel into the combustion chamber;

FIG. 24 illustrates a longitudinal cross-sectional view of a third embodiment of the second aspect of a gas turbine engine incorporating a system using fuel to cool the turbine and the associated blades thereof, in cooperation with the second embodiment of the second aspect of a rotary injector for injecting the resulting preheated fuel into the combustion chamber;

FIG. 25 illustrates a longitudinal cross-sectional view of a fourth embodiment of the second aspect of a gas turbine engine incorporating a system using fuel to cool the turbine and the associated blades thereof, in cooperation with a fourth embodiment of the second aspect of a rotary injector for injecting the resulting preheated fuel into the combustion chamber;

FIG. 26 illustrates a fragmentary longitudinal cross-sectional view of a second embodiment of the first aspect of a gas turbine engine incorporating the first embodiment of the first aspect of a rotary injector for injecting fuel into the combustion chamber;

FIG. 27 illustrates a fragmentary longitudinal cross-sectional view of a fifth embodiment of the second aspect of a gas turbine engine incorporating the first embodiment of the second aspect of a rotary injector for injecting fuel into the combustion chamber;

FIG. 28*a* illustrates a fragmentary cross-sectional side view of a fifth embodiment of the second aspect of a rotary injector;

FIG. 28*b* illustrates an end view of the fifth embodiment of the second aspect of a rotary injector; and FIG. 28*c* illustrates a fragmentary cross-sectional top view of the fifth embodiment of the second aspect of a rotary injector.

DESCRIPTION OF EMBODIMENT(S)

Figure 1:
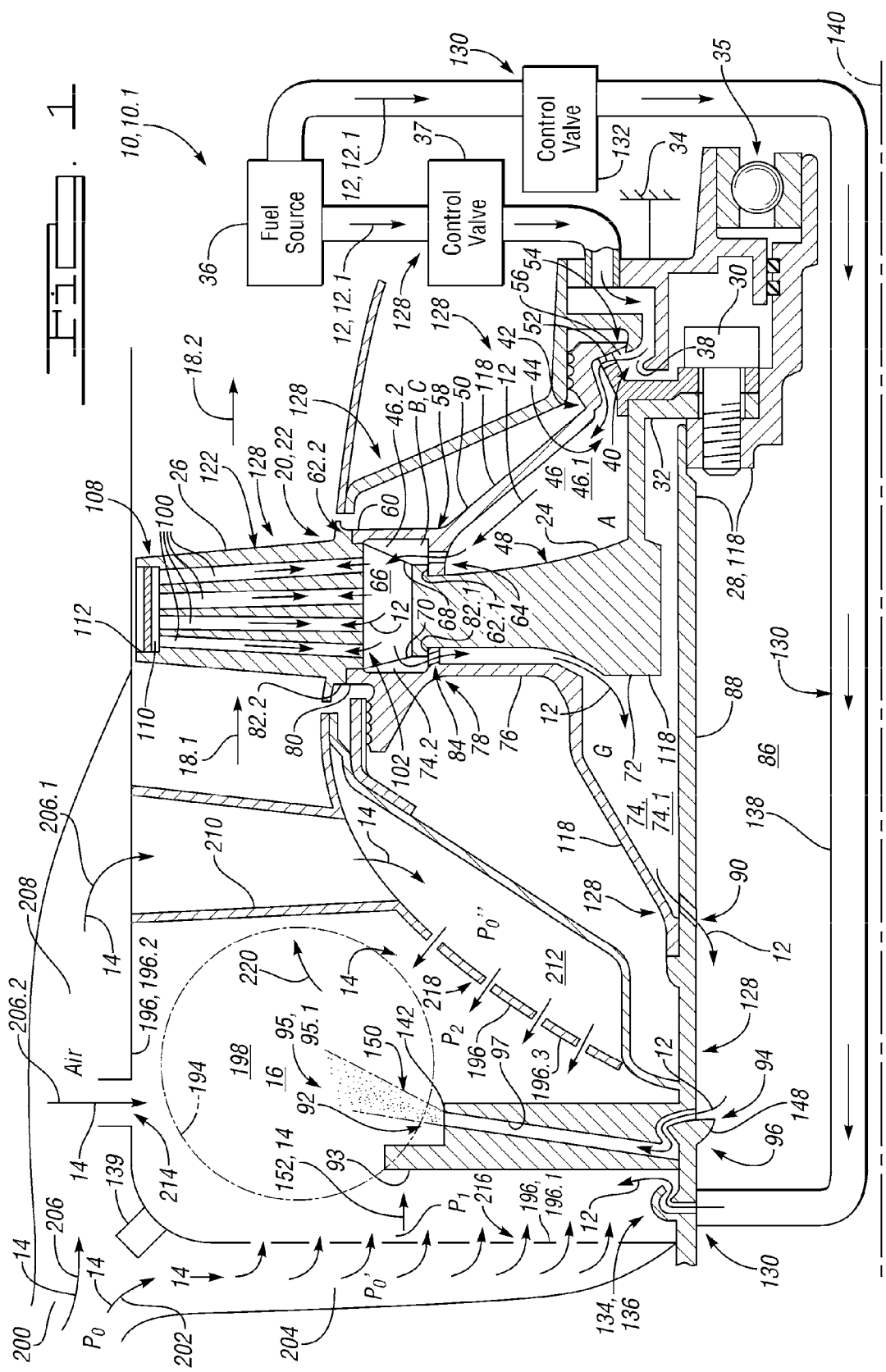
FIG. 1 illustrates a longitudinal cross-sectional view of a first embodiment of a first aspect of a gas turbine engine incorporating a system using fuel to cool the turbine rotor and the associated blades thereof, in cooperation with a first embodiment of a first aspect of a rotary injector for injecting the resulting preheated fuel into the combustion chamber.

Referring to FIG. 1, in a gas turbine engine 10, fuel 12 and air 14 are combusted in a combustion chamber 16 so as to generate relatively hot, relatively high pressure exhaust gases 18.1 which are directed through a turbine 20 comprising a bladed rotor 22, e.g. a rotor 24 incorporating a plurality of blades 26 on the periphery thereof. The turbine 20 is operatively coupled to a shaft assembly 28, e.g. with a bolt 30 through an associated flange 32, and the shaft assembly 28 is supported from the housing 34 of the gas turbine engine 10 by one or more bearings 35 that provide for rotation of the shaft assembly 28 and turbine 20 relative thereto. The action of the exhaust gases 18.1 against the blades 26 rotates the turbine 20 and the shaft assembly 28, which, for example, is operatively coupled to a compressor (not illustrated) that provides for pumping the air 14 into the combustion chamber 16. The exhaust gases 18.2 discharged from the turbine 20 are at a relatively lower pressure than the exhaust gases 18.1 upstream thereof as a result of the work done by the exhaust gases 18.1 on the turbine 20.

Under some conditions, for example, when operated as a turbo jet engine to propel a high-speed aircraft at high Mach numbers, the air 14 supplied to the gas turbine engine 10 is relatively hot, which contributes to increased temperature of the exhaust gases 18.1, and which is not sufficiently cool to otherwise provide for adequately cooling the turbine 20, so that the temperature of the associated blades 26 can become excessively high if not otherwise cooled. Under these conditions, the fuel 12 is generally sufficiently cool to provide sufficient cooling capacity to cool the gas turbine engine 10, and particularly, to cool the turbine 20 thereof, which might otherwise be susceptible to thermally induced failure, whereby the gas turbine engine 10 is cooled by directing fuel 12 from a source of fuel 36 through the rotor 24 and blades 26 of the turbine 20 to cool the rotor 24 and the blades 26 of the turbine 20, and then combusting this fuel 12—preheated by the cooling process—in the combustion chamber 16.

For example, fuel 12 from a source of fuel 36 comprising a fuel tank and an associated fuel pump is supplied through a first control valve 37 to an orifice 38 that is relatively fixed with respect to the housing 34 of the gas turbine engine 10. The fuel 12 is discharged from the orifice 38 into an inlet 40 of a first rotary fluid trap 42 operatively coupled to the rotor 24 so as to rotate therewith. The outlet 44 of the first rotary fluid trap 42 is in fluid communication with a first portion 46.1 of a first cavity 46 that is bounded by a portion of a first side 48 of the rotor 24 and by a first bounding surface of an aft cover 50 of which the first rotary fluid trap 42 is a part.

The first rotary fluid trap 42 comprises a passage 52 that provides for fluid communication between the inlet 40 and the outlet 44, wherein, in accordance with the teachings of U.S. Pat. Nos. 4,870,825, 6,269,647 and 6,925,812, each of which is incorporated herein by reference, and, as explained more fully hereinbelow, the passage 52 is adapted so the when the first rotary fluid trap 42 is rotated, a centrifugal acceleration at any point within the passage 52 is greater than a centrifugal acceleration at any point on either the inlet 40 or the outlet 44.

Accordingly, when the rotating passage 52 is filled with a relatively high density medium, such as liquid fuel 12.1, the radial levels of the inlet 40 and outlet 44 will be equal when there is no pressure differential therebetween, and will be otherwise unequal by an amount dependent upon the magnitude of the pressure differential and the speed of rotation. For a relatively low pressure supply of liquid fuel 12.1 to an inlet 40 of a passage 52 feeding a relatively high pressure region at the outlet 44, at a sufficient speed of rotation, the passage 52 can prevent backflow therethrough. Accordingly, the first rotary fluid trap 42 provides for isolating the pressure in the first cavity 46—which can be relatively high—from the pressure at the inlet 40 of the passage 52—which is relatively lower—thereby providing for supplying fuel 12 to the inlet 40 of the first rotary fluid trap 42 across a rotary junction 54 between the rotating inlet 40 and the relatively fixed orifice 38, whereby liquid fuel 12.1 sprayed from the relatively fixed orifice 38 becomes captured by an internal trough 56 associated with the inlet 40 of the first rotary fluid trap 42 as a result of centrifugal acceleration acting upon the liquid fuel 12.1 upon striking the internal trough 56 and rotating therewith.

Figure 2:
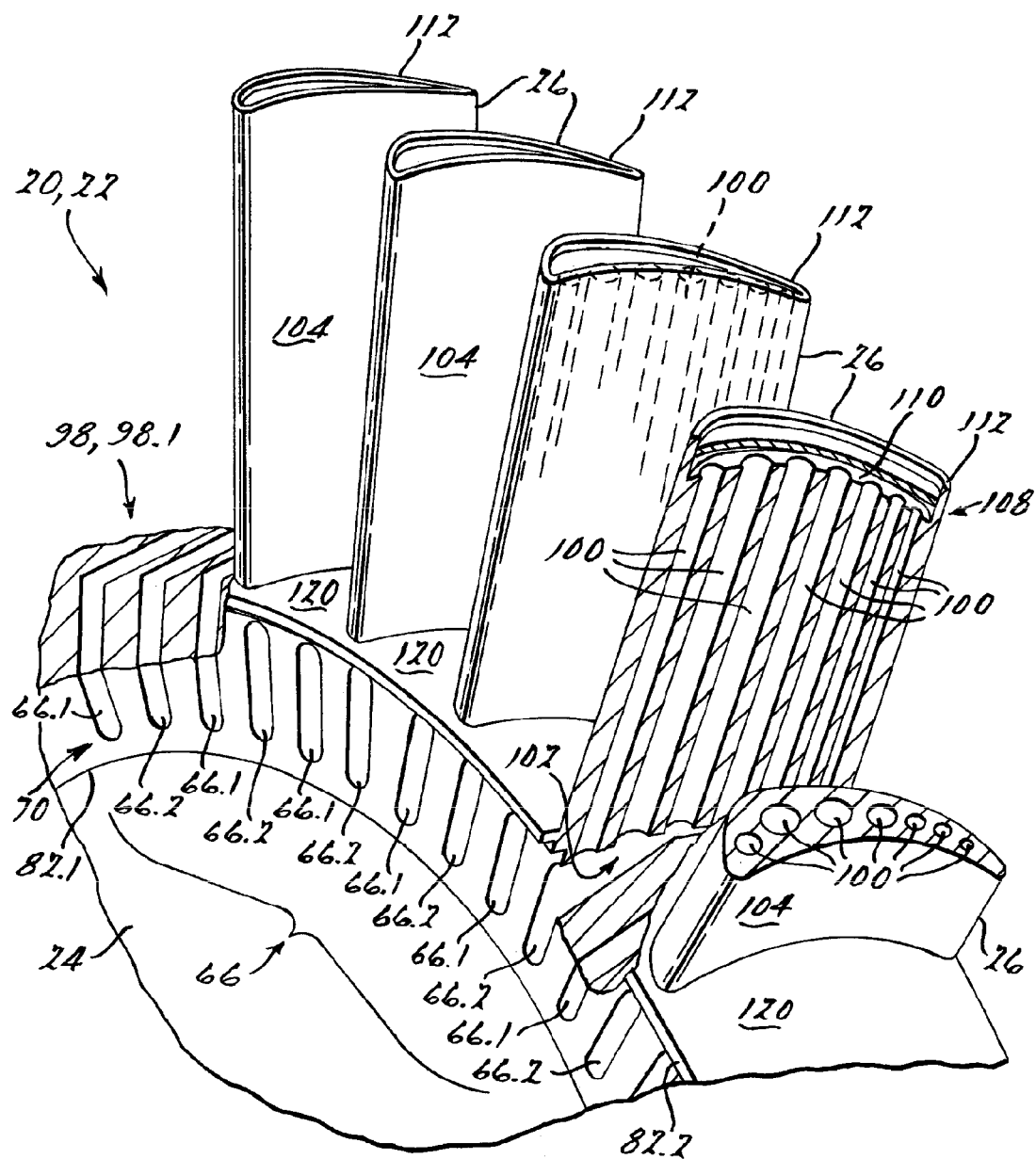
FIG. 2 illustrates an isometric view of a portion of a bladed rotor and associated fragmentary sectional views thereof.

The aft cover 50 comprises an intermediate rim 58 and an outer rim 60 that engage respective first 62.1 and second 62.2 lips formed on the first side 48 of the rotor 24. The outer rim 60 is sealed to the second lip 62.2 so as to prevent leakage of fuel 12 from the joint therebetween. The intermediate rim 58 incorporates at least one passage 64 that provides for fluid communication between first 46.1 and second 46.2 portions of the first cavity 46. The second portion 46.2 of the first cavity 46 is in fluid communication with a plurality of first passages 66 that extend through the rotor 24. Referring also to FIG. 2, each first passage 66 has a first opening 68 on the first side 48 of the rotor 24, and a second opening 70 on a second side 72 of the rotor 24, the first 48 and second 72 sides being opposite to one another.

The first passages 66 are in fluid communication with a second portion 74.2 of a second cavity 74 that is bounded by a portion of the second side 72 of the rotor 24 and by a second bounding surface of a forward cover 76, wherein the forward cover 76 comprises an intermediate rim 78 and an outer rim 80 that engage respective first 82.1 and second 82.2 lips formed on the second side 72 of the rotor 24. The outer rim 80 is sealed to the second lip 82.2 so as to prevent leakage of fuel 12 from the joint therebetween. The intermediate rim 78 incorporates at least one passage 84 that provides for fluid communication between the second portion 74.2 of the second cavity 74 and a first portion 74.1 thereof. The first portion 74.1 of the second cavity 74 is in fluid communication with the interior 86 of a shaft 88 of the shaft assembly 28 via at least one passage 90 extending through the wall of the shaft 88, and the interior 86 of the shaft 88 is in fluid communication with at least one first discharge orifice 92 of one or more arms 93 of a rotary injector 95, through at least one passage 94 extending through the wall of the shaft 88. The rotary injector 95 is operatively coupled to the shaft 88 and is adapted to rotate therewith. The at least one first discharge orifice 92 is in fluid communication with the combustion chamber 16, and thereby provides for a discharge of fuel 12 from the one or more arms 93 of the rotary injector 95 into the combustion chamber 16. For example, in one embodiment, the at least one first discharge orifice 92 communicates through at least one associated fluid passage 97 in the one or more arms 93 with a second rotary fluid trap 96 that provides for isolating the relatively high pressure of the combustion chamber 16 from the relatively lower pressure of the interior of the shaft 88 and the first portion 74.1 of the second cavity 74, whereby the principles of structure and operation of the second rotary fluid trap 96 are the same as those of the first rotary fluid trap 42 described hereinabove.

Figure 5:
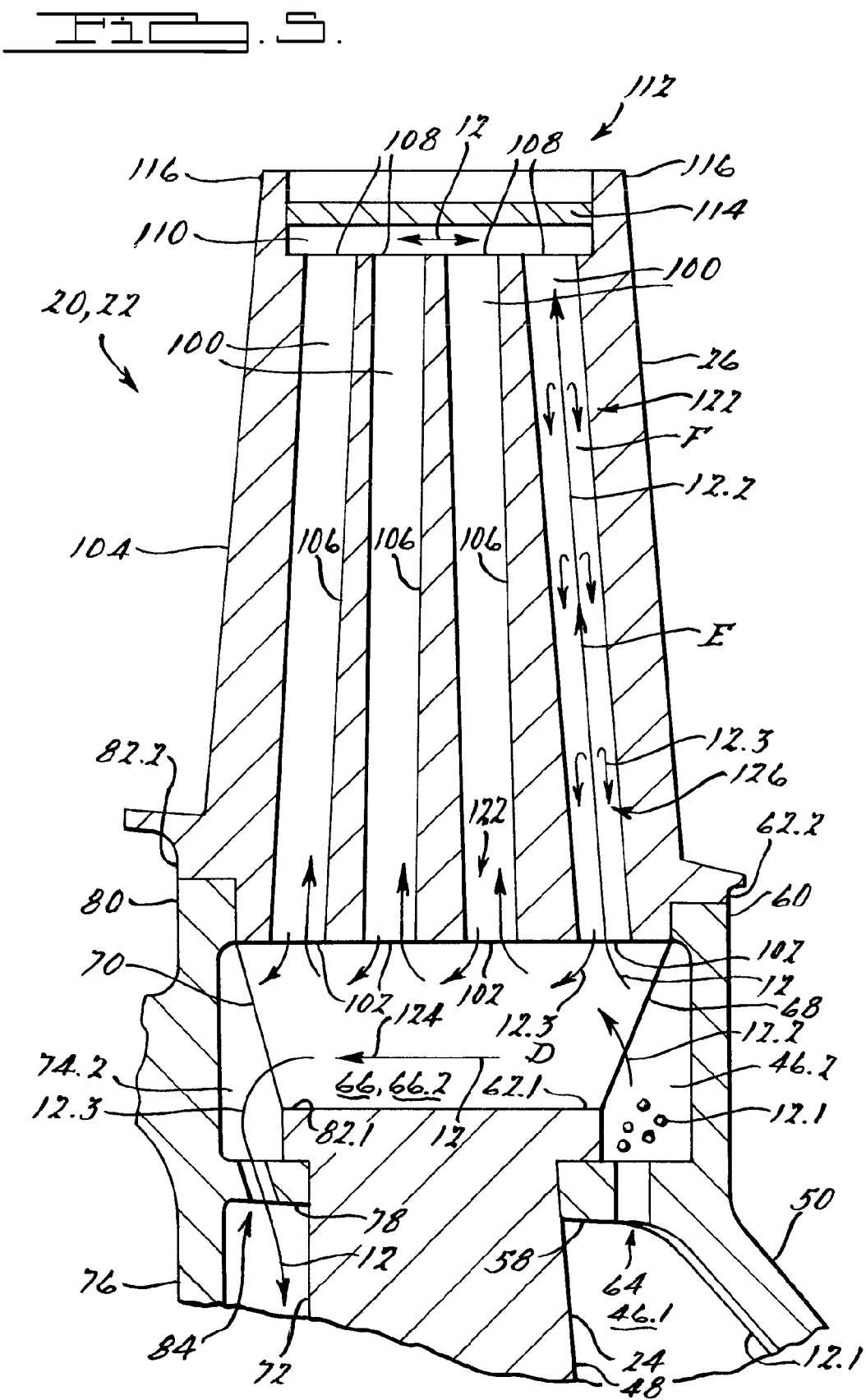
FIG. 5 illustrates a cross-sectional view of a portion of a bladed rotor and an associated thermosiphon process therein.

Referring to FIGS. 2 and 5, the first passages 66 and associated first 68 and second 70 openings are substantially uniform in size and shape, and uniformly distributed so as to provide a mechanically balanced rotor 24. The axial shape 98 of the first passages 66 is adapted to at least partially conform to a profile of the associated blades 26. For example, in the embodiment illustrated in FIG. 2, the first passages 66 have chevron axial shape 98.1 so as to at least partially conform to the camber of the blades 26. A first set 66.1 of first passages 66 extend through the rotor 24 at associated circumferential locations that are substantially between the associated circumferential locations of the associated blades 26, and a second set 66.2 of first passages 66 extend through the rotor 24 at associated circumferential locations that are substantially aligned with the associated circumferential locations of the associated blades 26, whereby the first 66.1 and second 66.2 sets of first passages 66 are interleaved with respect to one another. Each of the blades 26 incorporates a plurality of second passages 100 that extend substantially radially therewithin, each of which at a first end 102 thereof intersects an associated first passage 66 of the second set 66.2 that is aligned therewith. For example, the second passages 100 are substantially linear along the length thereof. As illustrated in FIG. 2, the diameter of the second passages 100 within a particular blade 26 can be adapted in accordance with the associated blade thickness proximate thereto, so as to provide sufficient heat transfer between the outer surface 104 of the blade 26 and the surface 106 of the associated second passage 100 while providing for adequate blade strength. The distal second ends 108 of the second passages 100 are terminated in a third cavity 110 proximate to a tip 112 of the blade 26, wherein the third cavity 110 provides for fluid communication amongst the second passages 100 within the associated blade 26. For example, the third cavity 110 is formed by an end cap 114 that is separated from the second ends 108 of the second passages 100, and which is secured at its periphery to the edge 116 of the blade 26. The blades 26 are closed with respect to the combustion chamber 16 relative to the fuel 12 within the blades 26, so that all of the fuel 12 enters the combustion chamber 16 at a location that is radially inward of the blades 26.

Accordingly, the gas turbine engine 10 comprises a rotatable portion 118 that is rotatable with respect to a housing 34 of the gas turbine engine 10, wherein the rotatable portion 118 comprises the turbine 20/bladed rotor 22, comprising the rotor 24 and the blades 26; the aft cover 50 and associated first rotary fluid trap 42; the forward cover 76; and the shaft assembly 28/shaft 88 and associated first discharge orifice 92/second rotary fluid trap 96, all of which rotate in unison with a rotating frame of reference. After discharge from the relatively fixed orifice 38, the fuel 12 is contained within the rotatable portion 118 until discharge directly into the combustion chamber 16 from the first discharge orifice 92 of the rotatable portion 118 in the rotating frame of reference Accordingly, because all of the elements of the rotatable portion 118 rotate in unison with the rotating frame of reference, these elements can be readily sealed to one another as necessary to contain the fuel 12 therein, for example, at the junctions of the outer rims 60, 80 of the first 50 and second 76 bounding surfaces with the second lips 62.2, 82.2 of the rotor 24, which could otherwise be problematic if it were necessary to provide for sealing across a relatively moving junction of elements to be sealed to one another.

With the gas turbine engine 10 in operation, liquid fuel 12.1 provided by the source of fuel 36 and regulated by the first control valve 37 is discharged from the relatively fixed orifice 38 into the internal trough 56 of the inlet 40 of the first rotary fluid trap 42. The discharged liquid fuel 12.1 is captured by the internal trough 56 as a result of the centrifugal acceleration acting upon the discharged liquid fuel 12.1 which commences rotation with the rotatable portion 118 upon impact with the internal trough 56 or the liquid fuel 12.1 contained therein. Liquid fuel 12.1 entering the inlet 40 of the first rotary fluid trap 42 is pumped through the associated passage 52 of the first rotary fluid trap 42 by the action of centrifugal acceleration forces acting upon the liquid fuel 12.1 contained within the first rotary fluid trap 42, and this action of centrifugal acceleration forces also isolates the relatively low pressure at the inlet 40 of the first rotary fluid trap 42 from a relatively high pressure at the outlet 44 thereof. Upon exiting the outlet 44 of the first rotary fluid trap 42, the fuel 12 is accelerated radially outwards, whereby liquid fuel 12.1—which is relatively dense in comparison with associated fuel vapor—tends to follow the inside of the aft cover 50.

Figure 3:
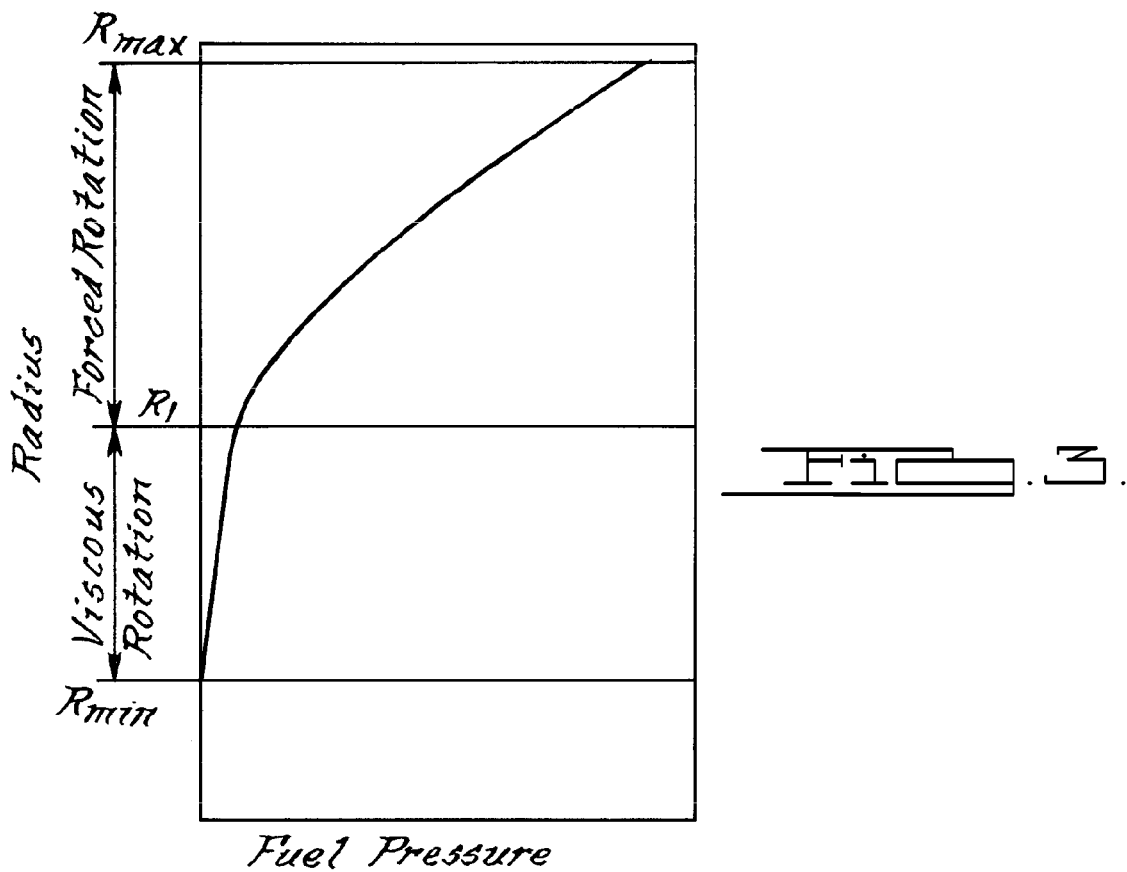
FIG. 3 illustrates a diagram of the relationship between fuel pressure and radial location within the bladed rotor of the gas turbine engine illustrated in FIG. 1.
Figure 4:
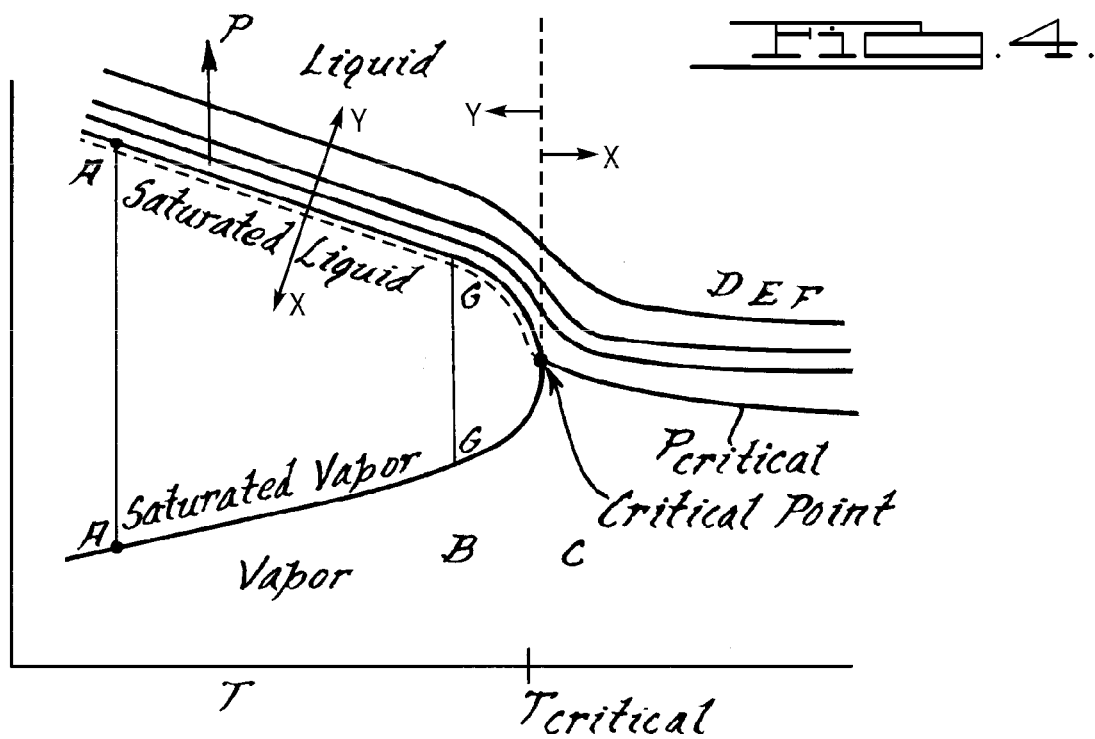
FIG. 4 illustrates a diagram of the density and state of fuel as a function of temperature and pressure.

During normal operation of the gas turbine engine 10, the hottest portion of the turbine 20/bladed rotor 22 are the blades 26 which are directly exposed to the relatively hot exhaust gases 18.1 from the combustion chamber 16. Heat from the blades 26 is transferred to the rotor 24 and associated first 50 and second 76 bounding surfaces, which provides for heating any fuel 12 in the associated first 46 and second 74 cavities that are adjacent to the first 48 and second 72 sides of the rotor 24. Accordingly, the temperature of the rotor 24 and the adjacent aft cover 50 increases with decreasing distance from the blades 26, so that fuel 12 within the first cavity 46 is heated as it flows radially outwards. Furthermore, referring to FIG. 3, the centrifugal acceleration acting upon the fuel 12 increases with increasing radial distance within the first cavity 46, which increases the associated pressure thereof. Fuel 12 in the first 46 or second 74 cavities is rotated by viscous forces generated as a result of relative motion of the rotor 24 and aft cover 50 acting with respect to the liquid or vapors in the associated first 46 or second 74 cavities, whereas fuel 12 in the first 66 or second 100 passages is forced to rotate with the rotor 24 and blades 26. Accordingly, as illustrated in FIG. 3, in the former region of viscous rotation, the fuel pressure increases at a lower rate with respect to radial distance than in the latter forced region because of slippage within the flow stream than can occur in the former region but not in the latter. Referring to FIG. 4, as the fuel 12 is heated in the first portion 46.1 of the first cavity 46, the fuel 12 is transformed from a saturated liquid to a saturated vapor, as indicated by the locus of points labeled "A", which is also shown in FIG. 1. As the fuel 12 flows from the first 46.1 to the second portion 46.1 of the first cavity 46, the fuel 12 becomes superheated, and may exhibit a mixture of states as indicated by the points labeled "B" and "C" in FIGS. 1 and 4.

As the fuel 12 flows through the first opening 68 into the first passage 66, it becomes further heated and pressurized. Fuel 12 in the first set 66.1 of first passages 66 flows therethrough, out of the second openings 70 thereof, and then into the second portion 74.2 of the second cavity 74, and in the process, provides for cooling the rim 120 of the rotor 24 in the regions between the blades 26. Referring to FIG. 5, the centrifugal acceleration field causes relatively dense fuel 12 in the second set 66.2 of first passages 66 to flow into the second passages 100 intersecting therewith, which displaces fuel 12 therein that has become relatively more heated and less dense, responsive to a thermosiphon process that is driven by the centrifugal acceleration field and by the decrease in density as fuel 12 becomes heated as a result of heat transfer from the blades 26 which cools the blades 26. The thermosiphon flow 122 within the second passages 100 and between the first 66 and second 100 passages causes a continuous exchange of relatively cooler fuel 12.2 for relatively hotter fuel 12.3, which is also illustrated by the points "D", "E" and "F" in FIGS. 4 and 5. The relatively hotter fuel 12.3 ultimately flows through the second opening 70 of the second set 66.2 of first passages 66 and into the second portion 74.2 of the second cavity. The second set 66.2 of first passages 66 provides for the flow of fuel 12 either directly therethrough from the first opening 68 to the second opening 70 along a first flow path 124, which provides for cooling the rotor 24 at the base of the associated blade 26; or indirectly after first flowing along a second flow path 126 which includes one or more second passages 100 responsive to a thermosiphon process, which provides for cooling the associated blade 26 of the turbine 20.

The relatively less dense heated fuel 12.3 in the second portion 74.2 of the second cavity 74 flows through the passage 84 into the first portion 74.1 of the second cavity 74 after being displaced by relatively more dense less heated fuel 12 from the first passages 66. As the fuel flows radially inwards in the second cavity 74, the pressure thereof is reduced, and the fuel 12 is cooled by exchange of heat with the relatively cooler surroundings, transforming from a superheated vapor to a saturated vapor then a saturated liquid, as indicated by the locus of points labeled "G" on FIG. 4 corresponding to the location similarly labeled in FIG. 1. In accordance with a first embodiment of the gas turbine engine 10.1, the fuel 12 then flows through the passage 90, into the shaft 88, through the interior 86 of the shaft 88, out of the second passage 94 through the shaft 88, into and through the second rotary fluid trap 96, into and through the fluid passage 97 in the one or more arms 93 of the rotary injector 95, and into the combustion chamber 16 through the at least one first discharge orifice 92 intersecting a surface of the one or more arms 93.

The above-described system and method of cooling the turbine 20—wherein fuel 12 is delivered by a first fuel distribution circuit 128 from the source of fuel 36 through the first control valve 37 to the rotor 24 and blades 26—is beneficially used when the turbine 20 is at a temperature that is sufficient to vaporize the fuel 12 so as to mitigate against interfering with the mechanical balance of the turbine 20. In accordance with another aspect, it is beneficial to utilize a second fuel distribution circuit 130 that provides for injecting fuel directly into the combustion chamber 16 without involving flow through the rotor 24 and blades 26. Referring to FIG. 1, liquid fuel 12.1 supplied from the source of fuel 36 is regulated by a second control valve 132 and delivered to a second discharge orifice 134, for example, a part of a third rotary fluid trap 136, for example, operatively coupled to the shaft 88, wherein fuel 12 is supplied from the second control valve 132 through a separate passage 138 in the interior of the shaft 88. For example, the first 37 and second 130 control valves would be controlled so that all of the fuel 12 to the gas turbine engine 10, 10.1 is delivered by the second fuel distribution circuit 130 during startup and warm-up conditions. After the gas turbine engine 10, 10.1 has warmed up, in one embodiment, the second fuel distribution circuit 130 provides for a sufficient amount of fuel 12 to maintain an idle operating condition, and the remaining fuel 12 is provided by the first control valve 37 via the first fuel distribution circuit 128 responsive to operationally dependent demand. In another embodiment, all of the fuel 12 might be delivered by the first fuel distribution circuit 128 after the gas turbine engine 10, 10.1 has warmed up. In yet another embodiment, some other relative distribution of fuel 12 between the first 128 and second 130 fuel distribution circuits is used, for example, with the proportion of fuel 12 delivered by the first fuel distribution circuit 128 to the total fuel 12 delivered being from zero to one hundred percent. For example, in one embodiment, about five percent of the total fuel 12 is delivered by the first fuel distribution circuit 128. In addition to providing for cooling the blades 26 and rotor 24 of the turbine 20, the first fuel distribution circuit 128 also provides for a regenerative recovery of heat from the exhaust 18.1 so as to provide for improved operating efficiency, particularly for stationary applications.

The gas turbine engine 10, 10.1 incorporates an igniter 139 in cooperation with the combustion chamber 16, which provides for igniting the mixture of air 14 and fuel 12 therein, wherein the fuel 12 may be delivered by either the first 128 or second 130 fuel distribution circuit, or both the first 128 and second 130 fuel distribution circuits.

Figure 6:
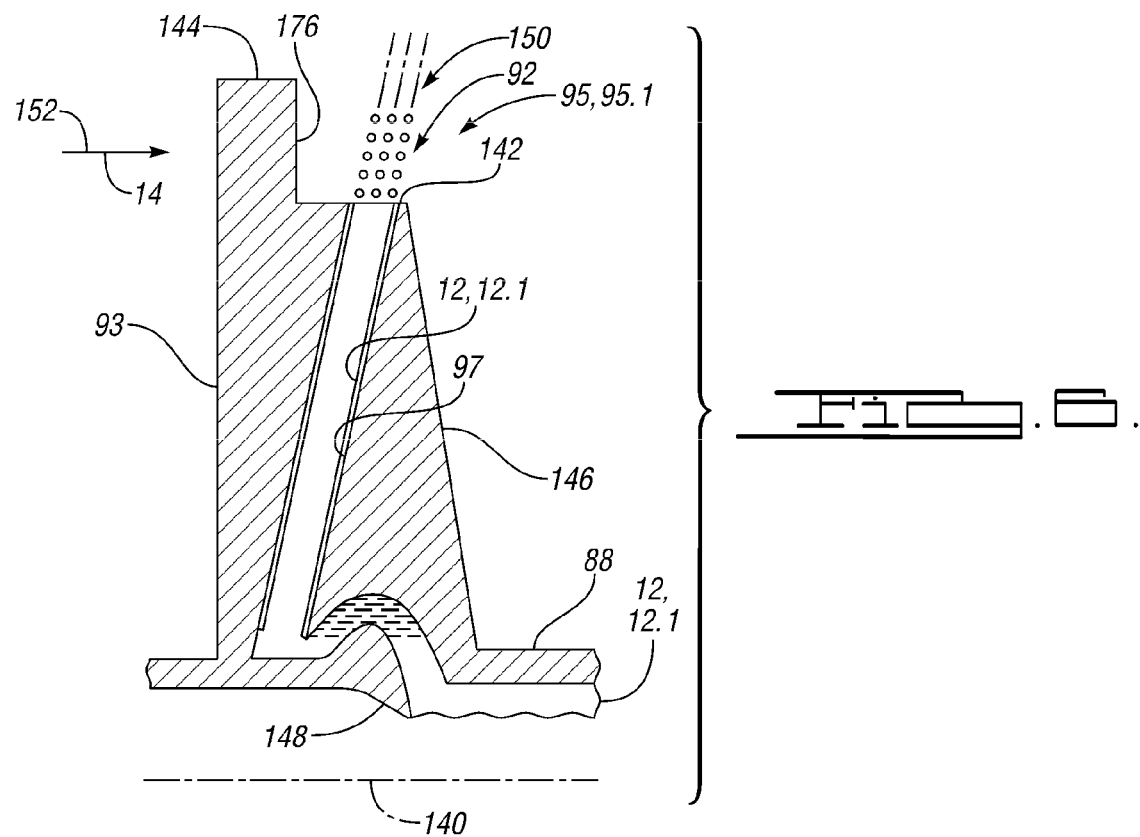
FIG. 6 illustrates a fragmentary cross-sectional view of the first embodiment of the first aspect of a rotary injector, in operation.

Referring to FIGS. 1 and 6, in accordance with a first embodiment of a first aspect, the rotary injector 95, 95.1 comprises one or more radially-extending arms 93 that are adapted to rotate about an axis of rotation 140, e.g. the central axis of the shaft 88 and shaft assembly 28. One or more lands 142 are located either on the tip 144 of the arm 93, or stepped into the trailing edge 146 of the arm 93, or both, from which depend the associated one or more first discharge orifices 92 intersecting therewith, which, in accordance with the first aspect, provide for injecting and atomizing liquid fuel 12.1 into the combustion chamber 16.

In operation, liquid fuel 12.1 flows into the shaft 88 from the passage 90 therethrough, along the inside of the shaft 88, and then through the passage 94 through the wall of the shaft 88, and into the second rotary fluid trap 96, wherein the interior of the shaft 88 is adapted with a weir 148 on the downstream side of the passage 94 so as to provide for diverting the liquid fuel 12.1 into the passage 94. Alternatively, the interior of the shaft 88 could be adapted with a groove or recess to facilitate the diversion of liquid fuel 12.1 into the passage 94. The operation of the second rotary fluid trap 96 is similar to that of the first rotary fluid trap 42 described hereinabove, wherein the second rotary fluid trap 96 provides for isolating the pressure in the interior of the shaft 88 and upstream thereof, from the pressure of the combustion chamber 16. Liquid fuel 12.1 flowing into the second rotary fluid trap 96 in excess of the trap volume thereof is discharged from the second rotary fluid trap 96 into the fluid passage 97 rotating with the arm 93.

The liquid fuel 12.1 within the associated rotating fluid passage 97 is subjected to a centrifugal acceleration field, the magnitude of which increases with the square of the radial distance from the axis of rotation 140. This acceleration field causes the liquid fuel 12.1 to flow within the fluid passage 97 along an associated boundary layer, a thickness $\delta$ of which is inversely related to the magnitude of the associated acceleration field thereat. Liquid fuel 12.1 nearer to the center of the fluid passage 97 is subject to less drag and would be exhausted more quickly from the fluid passage 97 than would be fluid located further from the center of the fluid passage 97, and therefore closer to the boundary thereof. When the rotary injector 95, 95.1 is rotated at a relatively high rotational speed typical of normal operating conditions, the liquid fuel 12.1 exits the fluid passage 97 at the first discharge orifice 92 on the land 142 as a relatively thin film, which is sprayed from the first discharge orifice 92 responsive to the relatively high centrifugal acceleration force thereat. Upon exit from the first discharge orifice 92, the sprayed liquid fuel 150 interacts with a cross-flow stream 152 of air 14, and the sprayed liquid fuel 150 is atomized thereby as a result of the effects of the associated relatively high aerodynamic shear forces and the surface tension of the sprayed liquid fuel 150. This arrangement provides for unchoked flow at the end of the fluid passage 97 and through the first discharge orifice 92, which provides for improved atomization, and which is also beneficial because the fluid passage 97 and first discharge orifice 92 are self-cleaning, i.e. the liquid fuel 12.1 therein is purged quickly upon shutoff of the gas turbine engine 10, 10.1, which in the case of hydrocarbon fuels would thereby help to prevent coking of the liquid fuel 12.1 in the fluid passage 97 or first discharge orifice 92. Furthermore, the land 142 cooperates with the first discharge orifice 92 so as to provide for inhibiting the attachment of liquid fuel 12.1 to a surface of the arm 93 upon discharge from the first discharge orifice 92, thereby providing for improved atomization and control of the resulting distribution of injected fuel 12 within the combustion chamber 16.

Figure 7:
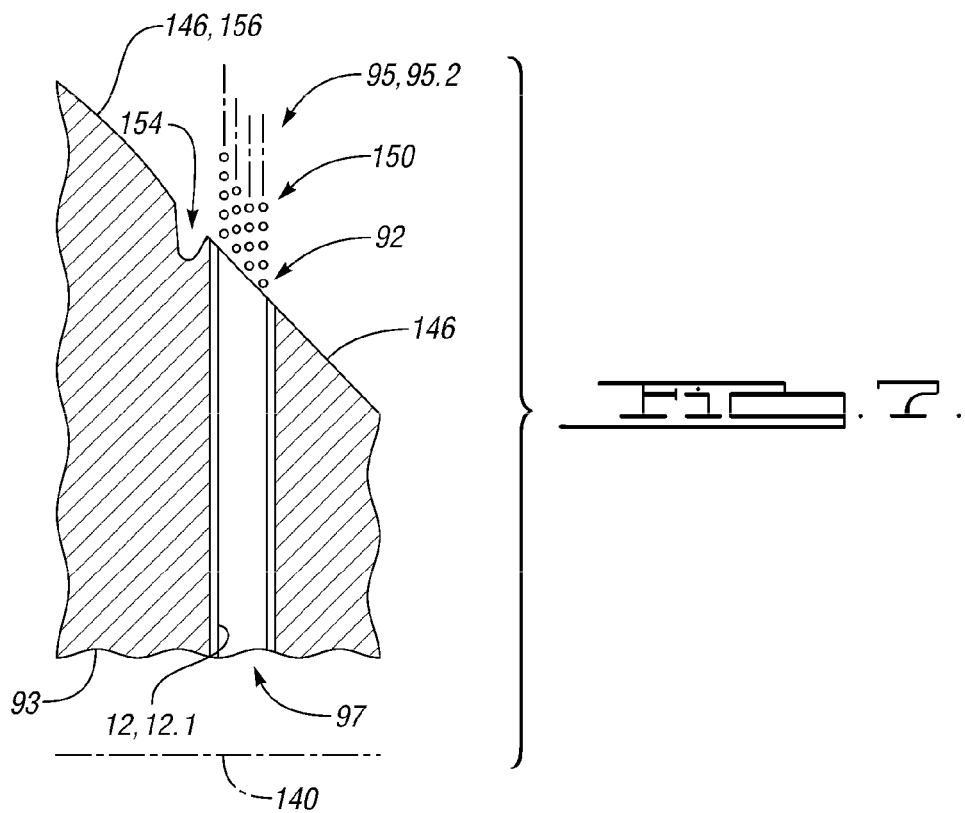
FIG. 7 illustrates a fragmentary cross-sectional view of a second embodiment of the first aspect of rotary injector incorporating an embodiment of an injector port and an associated groove on a trailing edge of an arm, in operation.

Referring to FIG. 7, in a second embodiment of the first aspect of a rotary injector 95, 95.2, the first discharge orifice 92 extends through the trailing edge 146 of an arm 93, wherein the profile of the trailing edge 146 thereat is oblique relative to the axis of rotation 140. A groove 154 is located on the trailing edge 146 between the first discharge orifice 92 and a portion 156 of the trailing edge 146 in a radially increasing direction—relative to the axis of rotation 140—from the first discharge orifice 92, wherein the groove 154 cooperates with the first discharge orifice 92 so as to provide for inhibiting the attachment of liquid fuel 12.1 to a surface of the arm 93 upon discharge from the first discharge orifice 92, which provides for improved atomization and control of the resulting distribution of injected fuel 12 within the combustion chamber 16.

Referring to FIG. 8a, in accordance with a third embodiment of the first aspect of a rotary injector 95, 95.3, the second passage 94 through the shaft 88 comprises at least one orifice 158 that is aligned with a corresponding at least one corresponding cylindrical groove 160 on the inside of the rotary injector 95, 95.3. The flow of liquid fuel 12.1 flowing from the passage 90 and then along the inside of the shaft 88 is choked by the associated orifice 158, thereby causing the liquid fuel 12.1 under pressure upstream thereof to be sprayed from the associated orifice 158 into the corresponding cylindrical groove 160 on the inside of the rotary injector 95, 95.3. The resulting sprayed liquid fuel 162 is collected by and within the rotating cylindrical groove 160, and the centrifugal forces generated by the resulting rotation of the resulting collected liquid fuel 164 in the rotating shaft assembly 28 causes a pressurization of the collected liquid fuel 164 in the cylindrical groove 160. For sufficient collected liquid fuel 164, the flow thereof into the associated fluid passage 97 may become choked thereat, as illustrated in FIG. 8a. Otherwise, the collected liquid fuel 164 drains un-choked through the fluid passage 97, as illustrated in FIG. 8b.

Referring to FIG. 9, in accordance with a fourth embodiment of the first aspect of a rotary injector 95, 95.4, a rotary fluid trap 166 located within the fluid passage 97 provides for isolating the pressure at the first discharge orifice 92 from the pressure at the entrance 168 of the fluid passage 97. In some applications, particularly when the pressure in the environment of the rotary injector 95, 95.4 is relatively high, it is beneficial to isolate the pressure at the first discharge orifice 92 from the pressure at the entrance 168 of the fluid passage 97.

In accordance with the teachings of U.S. Pat. Nos. 4,870,825, 6,269,647 and 6,925,812, incorporated herein by reference, the rotary fluid trap 166 comprises a fluid passage 170 with an inlet 172 and an outlet 174 in fluid communication there through along a length thereof, wherein the fluid passage 170 adapted so that when the rotary fluid trap 166 is rotated, a centrifugal acceleration at any point within the fluid passage 170 is greater than a centrifugal acceleration at any point on either the inlet 172 or the outlet 174. Accordingly, when the rotating fluid passage 170 is filled with a relatively high density medium, such as liquid fuel 12.1, the radial levels of the inlet 172 and outlet 174 will be equal when there is no pressure differential therebetween, and will be otherwise unequal by an amount dependent upon the magnitude of the pressure differential and the speed of rotation. Accordingly, for a relatively low pressure supply of liquid fuel 12.1 to an inlet 172 of a rotary fluid trap 166 feeding a relatively high pressure region at the outlet 174, the rotary fluid trap 166 can prevent backflow therethrough.

Referring to FIGS. 10 and 11, in the first embodiment of the first aspect of the rotary injector 95, 95.1, the associated land 142 and an adjacent riser surface 176 are stepped into the trailing edge 146 of an arm 93 of a rotary injector 95, 95.1. The first discharge orifice 92 is located on the land 142 a sufficient distance from the riser surface 176 so that the sprayed liquid fuel 150 from the first discharge orifice 92 does not attach to the riser surface 176 prior the interaction thereof with the cross-flow stream 152, thereby enabling or enhancing atomization of the sprayed liquid fuel 150. To the extent that the cross-flow stream 152 flows parallel to the sides 178 of the arm 93, the sprayed liquid fuel 150 may be at least partially shadowed therefrom for a limited period of time by the portion of the arm 93 upstream of the riser surface 176, however the rotation 180 of the arm 93 within the cross-flow stream 152, and turbulent wakes thereof behind the riser surface 176, also cause a circumferential component 182 of flow of the cross-flow stream 152 relative to the land 142. Furthermore, the sprayed liquid fuel 150 becomes fully exposed to cross-flow stream 152 as the riser surface 176 rotates past the location at which the sprayed liquid fuel 150 was initially injected.

Referring to FIG. 12, in a fifth embodiment of the first aspect of a rotary injector 95, 95.5, the associated land 142 and an adjacent riser surface 176 are stepped into the trailing edge 146 of an arm 93 of the rotary injector 95, 95.5, and the land further comprises a groove 154 located between the first discharge orifice 92 and the riser surface 176. More particularly, the groove 154 extends between the riser surface 176 and the first discharge orifice 92. With the arm 93 rotating, liquid fuel 12.1 exiting from the first discharge orifice 92 would require an increase in potential energy in order to migrate into the groove 154, and accordingly is precluded from doing so by this potential energy barrier. Accordingly, the groove 154 located between the first discharge orifice 92 and the riser surface 176 prevents liquid fuel 12.1 from migrating to the riser surface 176 upon exit from the first discharge orifice 92, and thereby enables or enhances the atomization of the liquid fuel 12.1 exiting the first discharge orifice 92.

Referring to FIG. 13, in a sixth embodiment of the first aspect of a rotary injector 95, 95.6, the first discharge orifice 92 and an associated land 142 is a generalized form of the fifth embodiment illustrated in FIG. 12, wherein the groove 154 is located on the land 142 between the first discharge orifice 92 and the riser surface 176, but not necessarily immediately adjacent to either. Generally, the minimum distance d between the first discharge orifice 92 and the trailing edge 146 of the arm 93 is limited by machining tolerances and by the amount of thermal mass necessary in the trailing edge 146 in order to prevent burn-out thereof during operation of the gas turbine engine 10.

Referring to FIGS. 14, 15a and 15b, in accordance with a seventh embodiment of the first aspect, the rotary injector 95, 95.7 comprises a plurality of arms 93, each of which incorporates a plurality of different lands 142 located at different radial distances from the axis of rotation 140, so as to distribute the sprayed liquid fuel 150 injected therefrom within and amongst the associated cross-flow stream 152 of air 14. For example, in the illustrated embodiment, three lands 142 are stepped into the trailing edge 146 of the arms 93, and one land 142 is located on the tip 144 thereof. Other embodiments may use a different number of lands 142. The arms 93 are connected to a disk 184 that is adapted to rotate about an associated axis of rotation 140.

Referring to FIG. 14, the arms 93 each incorporate an aerodynamic profile 186 having a leading edge 188 and a trailing edge 146 relative to a direction of rotation 180, and are oriented on the disk 184 with an angle of attack with respect to the cross-flow stream 152. As used herein, the term aerodynamic profile is intended to mean the profile of an aerodynamically smooth surface for which the irregularities are sufficiently small to be entirely embedded in the associated laminar sublayer. Furthermore, term aerodynamic profile is intended to refer to the profile of the blade absent the discontinuities, e.g. lands 142, associated riser surfaces 176 and/or grooves 154, resulting from modifications thereto in accordance with the instant embodiments as necessary to accommodate the associated first discharge orifices 92. For example, in one embodiment, the arms 93 are adapted to be aerodynamically neutral, i.e. so that they neither take nor give work to the cross-flow stream 152. In other words, in this embodiment, the arms 93 are oriented with a negligible angle of attack with respect to the cross-flow stream 152. In other embodiments, the arms 93 are adapted to extract work from the cross-flow stream 152, so that in operation, a pressure downstream of the rotary injector 95, 95.7 is less than a pressure upstream thereof.

Referring to FIGS. 15a and 15b, each land 142 of a particular arm 93 incorporates a first discharge orifice 92 that is operatively coupled by an associated fluid passage 97 to a manifold 190, for example, a cylindrical groove 160 as described hereinabove, which, for example, is adapted to receive liquid fuel 12.1 from an orifice 158 in the shaft 88. In the embodiment of FIG. 15a, this is accomplished by an arrangement of fluid passages 97 that intersect the surface of the manifold 190 at a substantially common location, whereas in the embodiment of FIG. 15b, this is accomplished by an arrangement of fluid passages that intersect a surface 192 of the manifold at distinct but substantially radially-uniform locations.

Figure 16:
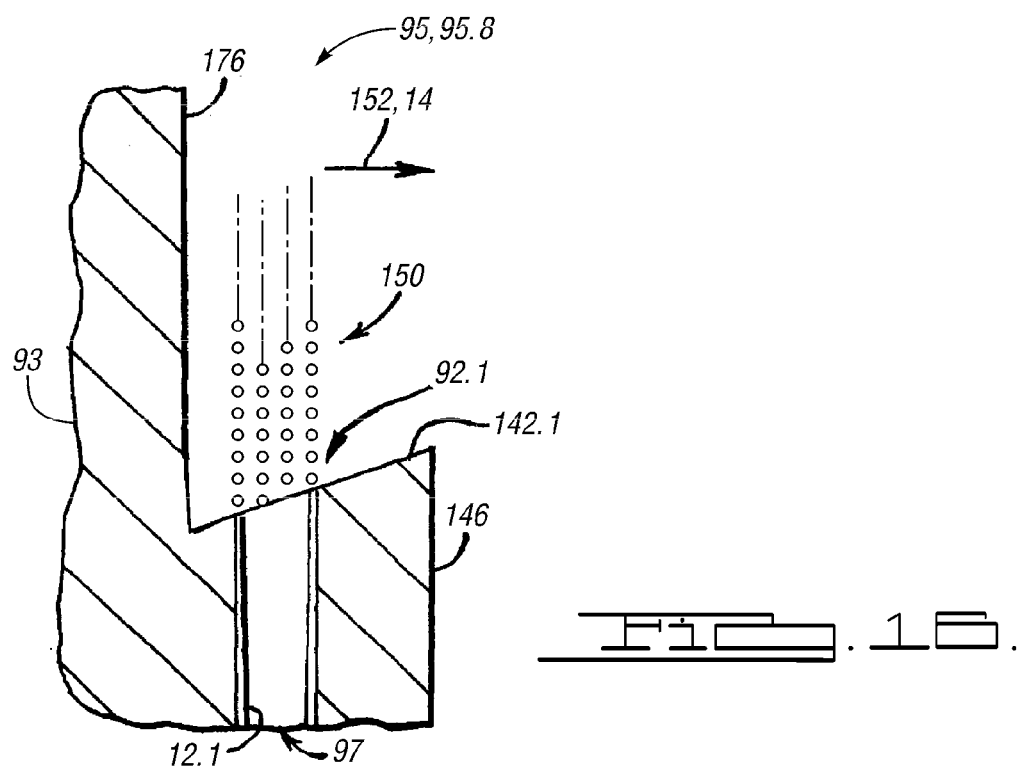
FIG. 16 illustrates a fragmentary cross-sectional view of an eighth embodiment of the first aspect of a rotary injector incorporating a fourth embodiment of an injector port and an associated land, in operation.

Referring to FIG. 16, in an eighth embodiment of the first aspect of a rotary injector 95, 95.8, an associated land 142.1 and an adjacent riser surface 176 are stepped into the trailing edge 146 of an arm 93 of a rotary injector 95, 95.8, wherein the land is sloped radially outwards from the riser surface 176 to the trailing edge 146 of the arm 93. With the arm 93 rotating, liquid fuel 12.1 exiting from an associated first discharge orifice 92.1 on the land 142.1 would require an increase in potential energy in order to migrate towards the riser surface 176, and accordingly is precluded from doing so by this potential energy barrier. Accordingly, the sloped land 142.1 prevents liquid fuel 12.1 from migrating to the riser surface 176 upon exit from the first discharge orifice 92, and thereby enables or enhances the atomization of the liquid fuel 12.1 exiting the first discharge orifice 92.

Figure 17:
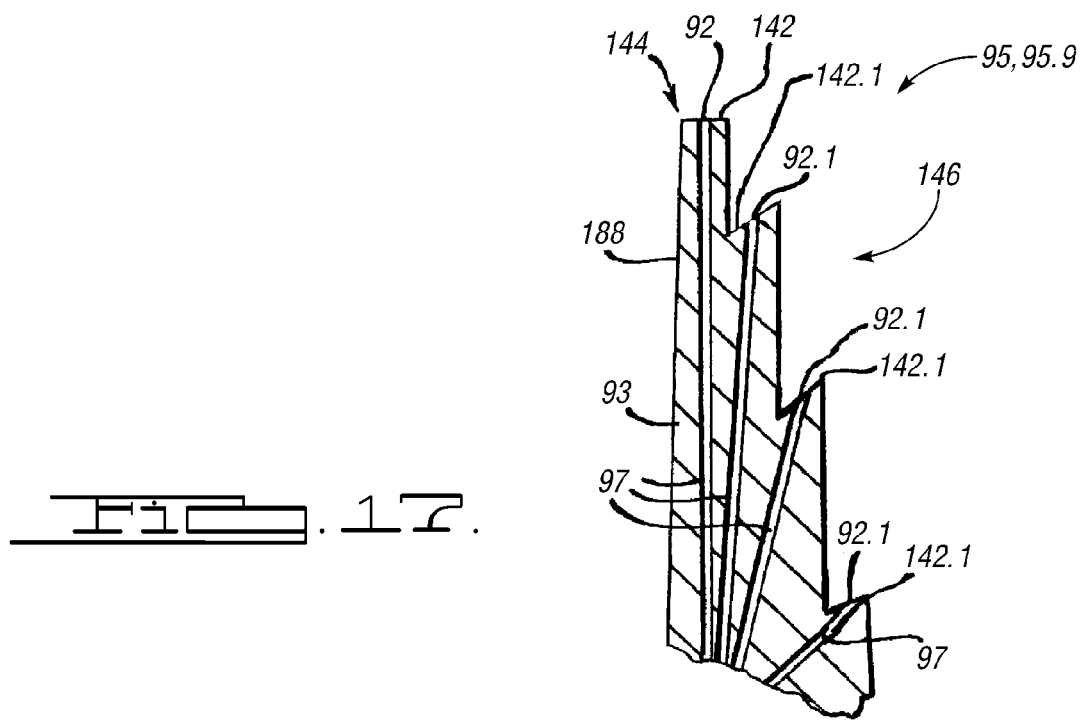
FIG. 17 illustrates a fragmentary cross-sectional view of a ninth embodiment of the first aspect of a rotary injector incorporating the fourth embodiment of an injector port and an associated land, in operation.

Referring to FIG. 17, in a ninth embodiment of the first aspect of a rotary injector 95, 95.8, each land 142, 142.1 of a particular arm 93 incorporates an associated first discharge orifice 92, 92.1 that receives liquid fuel 12.1 from an associated fluid passage 97 in the arm 93. for example, from a manifold 190 as illustrated in FIGS. 15a and 15b, wherein the land 142 at the tip 144 of the arm 93 need not be sloped, whereas the remaining lands 142.1 are sloped so as to prevent liquid fuel 12.1 from migrating to the riser surface 176 during operation thereof.

Referring again to FIG. 1, the combustion chamber 16 is adapted to receive air 14 both upstream and downstream of the rotary injector 95, which in cooperation with the radial injection of sprayed liquid fuel 150 from the one or more first discharge orifices 92 radially displaced from the shaft 88 of the gas turbine engine 10, 10.1 provides for sufficiently isolating the resulting primary annular combustion zone 194 from the surfaces 196 of the combustion chamber 16 so as to prevent or reduce an associated thermal degradation of those surfaces 196 by the associated combustion gases 198 therein, that might otherwise occur if the liquid fuel 12.1 from the passage 94 through the shaft 88 were injected directly proximate to the outer surface of the shaft 88 without the rotary injector 95, wherein the stream direction is generally in the direction leading from the combustion chamber 16 to the turbine 20. Accordingly, the rotary injector 95 is adapted to inject the fuel in an annular region of the combustion chamber 16 that is displaced from the associated shaft 88 of the gas turbine engine 10, 10.1. More particularly, air 14 (also known as CDP air, i.e. Compressor Discharge Pressure air) is supplied to a first annular plenum 200 by a compressor (not illustrated) of the gas turbine engine 10, 10.1, resulting in a pressure $P_0$ of the air 14 within the first annular plenum 200. The flow of air 14 from the first annular plenum 200 is bifurcated, a first portion 202 flowing into a second annular plenum 204 located adjacent to a forward surface 196.1 of the combustion chamber 16, and the remaining second portion 206 flowing into a third annular plenum 208 radially adjacent to an outer circumferential surface 196.2 of the combustion chamber 16. At least a portion 206.1 of the second portion 206 of air 14 in the third annular plenum 208 flows through the interior of at least one hollow vane 210 extending across a downstream portion of the combustion chamber 16, and into a fourth annular plenum 212 adjacent to an aftward surface 196.3 of the combustion chamber 16. The exterior of the at least one hollow vane 210, located upstream of the turbine 20, provides for guiding or straightening exhaust gases 18.1 flowing thereby into the turbine 20. In some embodiments, the outer circumferential surface 196.2 of the combustion chamber 16 is adapted with one or more orifices 214, for example, effusion cooling holes, that provide for a remaining portion 206.2 of the second portion 206 of air 14 in the third annular plenum 208 to flow generally radially inward directly into the combustion chamber 16. The forward surface 196.1 of the combustion chamber 16 is adapted with one or more orifices 216, for example, effusion cooling holes, that provide for the first portion 202 of air 14 to flow from the second annular plenum 204 into the combustion chamber 16. The aftward surface 196.3 of the combustion chamber 16 is adapted with one or more orifices 218, for example, effusion cooling holes, that provide for the portion 206.1 of the second portion 206 of air 14 to flow from the third annular plenum 208 into the combustion chamber 16. As used herein, the term annular is intended to mean that which comprises at least a portion of an associated annulus or an approximation thereof, for example, at least one circumferential segment of an annulus, or that which has a cross-section that corresponds to that of a corresponding annulus.

In operation, the pressure $P_0'$ of the first portion 202 of air 14 in the second annular plenum 204 would generally be less than pressure $P_0$ as a result of frictional losses along the associated flow path. Similarly, the pressure $P_0''$ of the portion 206.1 of the second portion 206 of air 14 in the fourth annular plenum 212 would generally be less than pressure $P_0$ as a result of frictional losses along the associated flow path. The gas turbine engine 10, 10.1 is adapted so that the pressure $P_0'$ in the second annular plenum 204 is greater than the pressure $P_1$ in the combustion chamber 16 proximate to the forward surface 196.1 of the combustion chamber 16, so that the first portion 202 of air 14 flows from the second annular plenum 204 through the one or more orifices 216 in the forward surface 196.1 of the combustion chamber 16, into the combustion chamber 16, and past the rotary injector 95, which causes a pressure $P_2$ in the combustion chamber 16 downstream of the rotary injector 95 proximate to the aftward surface 196.3 of the combustion chamber 16. The pressure $P_2$ downstream of the rotary injector 95 will be substantially equal to the pressure $P_1$ upstream of the rotary injector 95 if the rotary injector 95 is aerodynamically neutral, and will be less than the pressure $P_1$ if the rotary injector 95 is adapted, e.g. as a turbine, to extract work from the associated flowstream, and will be greater than the pressure $P_1$ if the rotary injector 95 is adapted, e.g. as a pump, to add work to the associated flowstream. Accordingly, the rotary injector 95, for example, the aerodynamic profile(s) 186 of the arm(s) 93 thereof, is adapted so that the pressure $P_2$ is less than the pressure $P_0''$ in the fourth annular plenum 212 by a sufficient amount so that a sufficient amount of air 14 flows from the fourth annular plenum 212 through the orifices 218 in the aftward surface 196.3 of the combustion chamber 16 and into the combustion chamber 16 so as to provide for proper operation of the associated primary annular combustion zone 194, for example, the isolation thereof from the aftward surface 196.3 of the combustion chamber 16. Stated in another way, if the pressure drop from $P_0$ to $P_0'$, is designated as $\delta_1$, the pressure drop across the orifices 216 in the forward surface 196.1 of the combustion chamber 16 is designated as $\delta_2$, the pressure increase by the action of the rotary injector 95 is designated as $\Delta_P$, and the pressure drop from $P_0$ to $P_0''$, is designated as $\delta_3$, then the pressures $P_2$ and $P_0''$ are respectively given by:

$$P_2 = P_0 - \delta_1 - \delta_2 + \Delta_P \quad (1)$$

$$P_0'' = P_0 - \delta_3 \quad (2)$$

so that the condition $P_2 < P_0''$ results in the requirement that $$\Delta_P < \delta_1 + \delta_2 - \delta_3. \quad (3)$$

In one embodiment, the primary annular combustion zone 194 is adapted to operate at close to a stoichiometric air/fuel ratio, and the one or more arms 93 are adapted, e.g. shaped, so as to mitigate against disturbance of the primary annular combustion zone 194. The fuel 12 is discharged from the one or more arms 93 with sufficient angular momentum so as to provide for proper mixing thereof with the cross-flow stream 152 of air 14.

Although the gas turbine engine 10, 10.1 is illustrated in FIG. 1 as a generally axial flow device, wherein the principal component of flow 220 in the combustion chamber 16 is in an axial direction, it should be understood that generally the rotary injector 95 could also be used in other gas turbine engine 10 configurations, for example, in a radial flow gas turbine engine 10.

Figure 18:
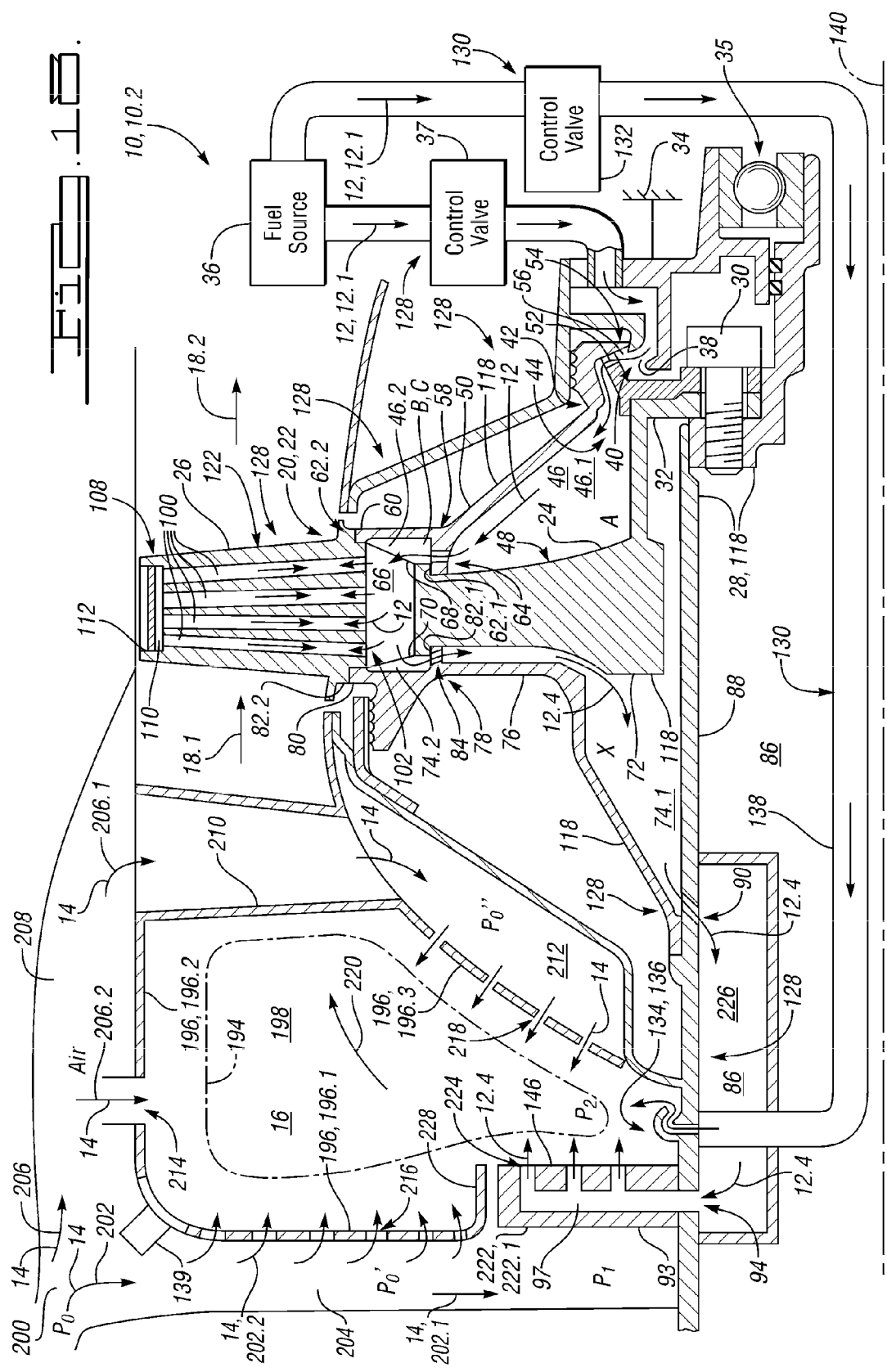
FIG. 18 illustrates a longitudinal cross-sectional view of a first embodiment of a second aspect of a gas turbine engine incorporating a system using fuel to cool the turbine and the associated blades thereof, in cooperation with a first embodiment of a second aspect of a rotary injector for injecting the resulting preheated fuel into the combustion chamber.

Referring to FIG. 18, a first embodiment of a second aspect of a gas turbine engine 10, 10.2 is illustrated incorporating a system using fuel 12 to cool the turbine 24 and the associated blades 26 thereof, in cooperation with a first embodiment of a second aspect of a rotary injector 222, 222.1 for injecting the resulting preheated fuel 12 into the combustion chamber 16 of the gas turbine engine 10, 10.2. Generally, unless described otherwise, the elements illustrated in FIG. 18 correspond to like numbered elements illustrated in FIG. 1 in both structure and operation. As with FIG. 1, FIG. 18 illustrates an environment comprising an axial-flow gas turbine engine 10, 10.2. In accordance with the second aspect, the gas turbine engine 10, 10.2 is operated at a sufficient level of power, and with associated sufficient levels of temperature in the associated exhaust gases 18.1, such that the fuel 12.4 flowing radially inwards into the first portion 74.1 of the second cavity 74, and thereafter until injection into the combustion chamber 16, is in a gaseous or vapor state as indicted by the locus of points labeled "X" on FIG. 4, and similarly indicated in FIG. 18, for which either the pressure at a given temperature is less than that of the "saturated liquid" boundary, or for which the temperature is greater than the critical temperature. The rotary injector 222, 222.1 is operatively coupled to the shaft 88 of the gas turbine engine 10, 10.2 so as to rotate therewith, and so as to receive fuel 12.4 therefrom. The rotary injector 222, 222.1 comprises one or more arms 93 that are adapted to inject fuel 12.4 from at least one location along the trailing edge 146 thereof that is radially displaced from the shaft 88 so that the fuel 12.4 is injected therefrom into an annular region that is separated from the shaft 88. The fuel 12.4 flows from the first portion 74.1 of the second cavity 74, through the passage 90, into the shaft 88, through the interior 86 of the shaft 88, out of the second passage 94 through the shaft 88, into and through a fluid passage 97 in the arm 93 of the rotary injector 222, 222.1, and into the combustion chamber 16 through at least one first discharge orifice 224 in the trailing edge 146 of the arm 93, wherein, for example, the first embodiment of the rotary injector 222, 222.1 is illustrated in FIG. 18 comprising three first discharge orifices 224 in the illustrated arm 93. Generally the shaft 88 would be sealed except at passages 90 and 94 so as to provide for the fuel 12.4 flowing in from passage 90 to then flow out through passage 94, without further non-negligible leakage from the shaft 88, which is provided in the embodiment illustrated in FIG. 18 by a localized cavity 226 within the interior 86 of the shaft 88. The rotary injector 222, 222.1 cooperates with a duct 228 extending from a radially inboard boundary of the forward surface 196.1 of the combustion chamber 16.

In operation, a first portion 202.1 of the first portion 202 of the air 14 flows from the second annular plenum 204 through the duct 228, past the rotary injector 222, 222.1, and into the combustion chamber 16 after mixing with the fuel 12.4 injected from the first discharge orifices 224 on the trailing edge(s) 146 of the one or more arms 93 of the rotary injector 222, 222.1. Furthermore, in parallel, a second portion 202.2 of the first portion 202 of the air 14 from the second annular plenum 204 flows directly into the combustion chamber 16 through the one or more orifices 216 in the forward surface 196.1 of the combustion chamber 16. The pressure $P_0'$ of the first portion 202 of air 14 in the second annular plenum 204 would generally be less than the pressure $P_0$ as a result of frictional losses along the associated flow path. Similarly, the pressure $P_0''$ of the portion 206.1 of the second portion 206 of air 14 in the fourth annular plenum 212 would also generally be less than the pressure $P_0$ as a result of frictional losses along the associated flow path. The pressure $P_1$ upstream of the rotary injector 222, 222.1 is less than the pressure $P_0'$ as a result of frictional losses along the associated flow path from the second annular plenum 204 to the inlet of the rotary injector 222, 222.1, and as a result of the discharge of the second portion 202.2 of air 14 from the second annular plenum 204 directly into the combustion chamber 16 through the one or more orifices 216 in the forward surface 196.1 of the combustion chamber 16. The gas turbine engine 10, 10.2 is adapted so that the pressure $P_2$ in the combustion chamber 16 downstream of the rotary injector 222, 222.1 proximate to the aftward surface 196.3 of the combustion chamber 16 is less than the pressure the pressure $P_0''$ in the fourth annular plenum 212 by a sufficient amount so that a sufficient amount of air 14 flows from the fourth annular plenum 212 through the orifices 218 in the aftward surface 196.3 of the combustion chamber 16 into the combustion chamber 16 so as to provide for proper operation of the associated primary annular combustion zone 194, for example, the isolation thereof from the aftward surface 196.3 of the combustion chamber 16. Stated in another way, with the pressure drop from $P_0$ to $P_0'$ designated as $\delta_1$, the pressure drop from $P_0'$ to $P_1$ designated as $\delta_4$, the pressure increase by the action of the rotary injector 95 designated as $\Delta_P$, and the pressure drop from $P_0$ to $P_0''$ designated as $\delta_3$, then the pressures $P_2$ and $P_0''$ are respectively given by:

$$P_2 = P_0 - \delta_1 - \delta_4 + \Delta_P \quad (4)$$

$$P_0'' = P_0 - \delta_3 \quad (5)$$

so that the condition $P_2 < P_0''$ results in the requirement that $$\Delta_P < \delta_1 + \delta_4 - \delta_3. \quad (6)$$

Figure 19:
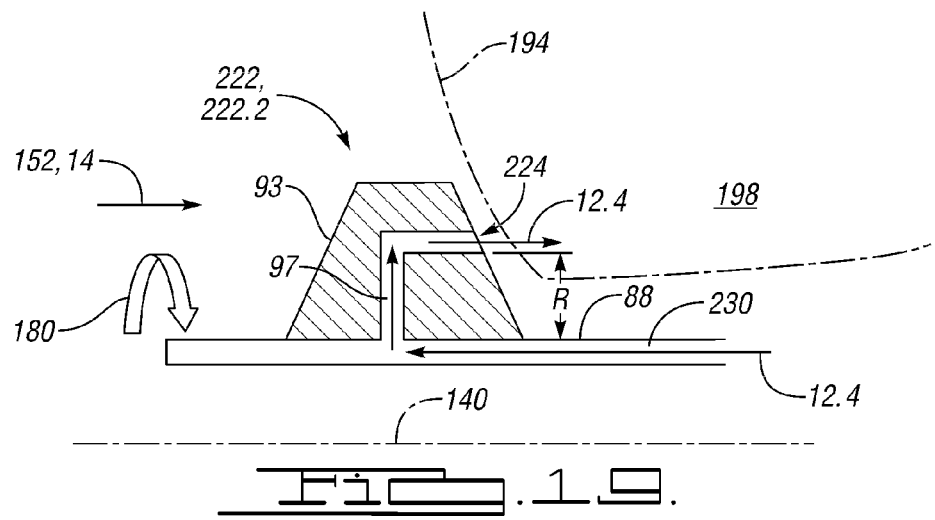
FIG. 19 illustrates a fragmentary cross-sectional view of a second embodiment of the second aspect of a rotary injector, in operation.

Referring to FIG. 19, a second embodiment of the second aspect of a rotary injector 222, 222.2 is illustrated comprising a single first discharge orifice 224 in the trailing edge 146 of the associated arm 93 operatively coupled to a shaft 88 having a rotation 180 about an associated axis of rotation 140. Fuel 12.4 in a gaseous or vapor state is supplied to a fluid passage 97 in the rotary injector 222, 222.2 from a fluid passage 230, and is discharged from the rotary injector 222, 222.2 through the associated first discharge orifice 224 operatively coupled to the fluid passage 97 and rotating therewith. The discharged fuel 12.4 mixes and is combusted with the associated cross-flow stream 152 of air 14 in an associated primary annular combustion zone 194 that is sufficiently separated from the shaft 88 as a result of the radial offset R of the first discharge orifice 224 relative thereto so that the shaft 88 is not adversely affected by the resulting combustion gases 198.

Figure 20:
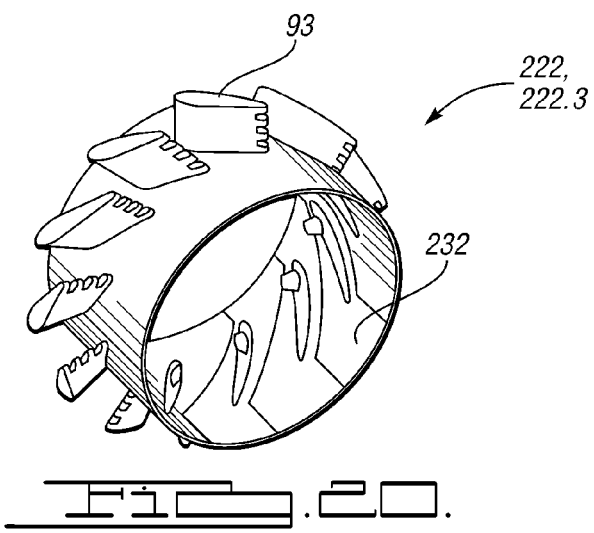
FIG. 20 illustrates a third embodiment of the second aspect of a rotary injector.
Figures 21, 22:
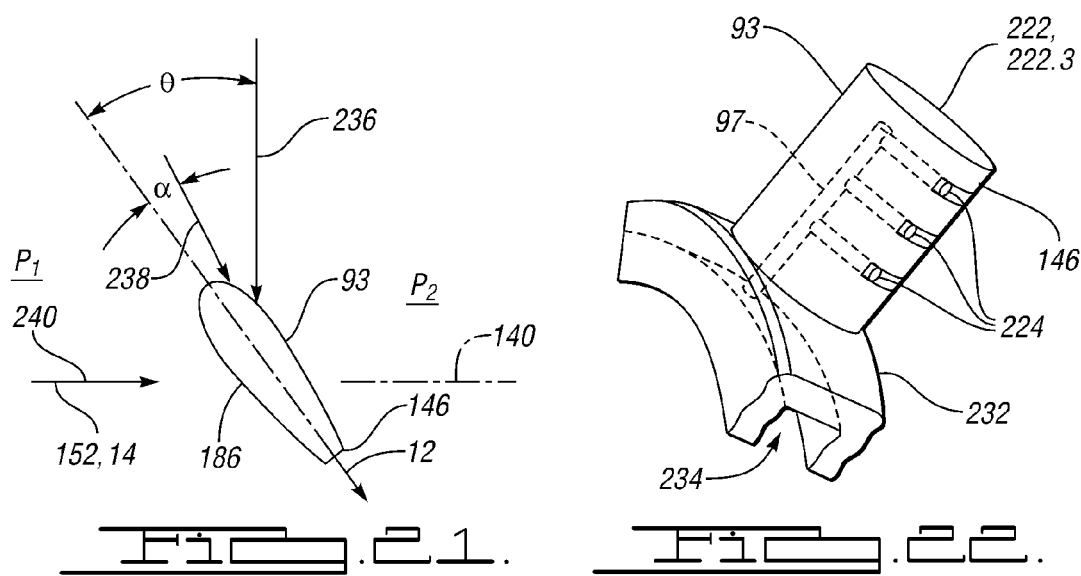
FIG. 21 illustrates a free body diagram of an arm of a rotary injector.
FIG. 22 illustrates an arm of the third embodiment of the second aspect of a rotary injector, and the associated fuel distribution circuit therein.

Referring to FIGS. 20-22, a third embodiment of the second aspect of a rotary injector 222, 222.3 is illustrated comprising a plurality of arms 93 located on and around an associated hub 232. Each arm 93 is shaped with an aerodynamic profile 186, and a plurality, e.g. three, first discharge orifices 224 are incorporated in the trail edge 146 of each arm 93. Within each arm 93, each first discharge orifice 224 is in fluid communication with an associated fluid passage 97 that is in fluid communication with an internal groove 234 in the hub 232, wherein the internal groove 234 is in fluid communication with at least one passage 90 in a shaft 88 of the gas turbine engine 10 so as to provide for receiving fuel 12.4 therefrom. Accordingly, the fluid passage 97 acts as a manifold to distribute gaseous or vapor fuel 12.4 from a cavity bounded by the internal groove 234 and shaft 88, to the associated first discharge orifices 224 on the trailing edge of each arm 93. In view of equation (6), and referring to FIG. 21, the aerodynamic profile 186 of each arm 93, and the orientation thereof on the hub 232 with respect to the axis of rotation 140, is adapted so that equation (6) is satisfied with sufficient margin so as to provide for a sufficient flow of air 14 from the one or more orifices 218 in the aftward surface 196.3 of the combustion chamber 16. More particularly, the cross-flow stream 152 of air 14—for example, flowing in a direction that is substantially coaxial with the axis of rotation 140—is incident upon the rotating arm 93 that is physically oriented at an angle θ relative to the direction of rotation. Relative to the arm 93, the component of velocity 236 of the ambient air 14 as a result of the rotation of the arm 93 is in a direction that is opposite to the direction of rotation of the arm 93. Accordingly, the net relative velocity 238 of the air 14 relative to the rotating arm 93 is given by the vector sum of the velocity 240 of the cross-flow stream 152 of air 14 and the component of velocity 236 of the ambient air 14 as a result of the rotation of the arm 93, whereby the net relative velocity 238 is at an angle θ—the angle of attack—relative to the arm 93. The pressure increase $\Delta_P$ across the rotary injector 222, 222.3 is then given as a function of the angle of attack α, the shape of the associated aerodynamic profile 186, and the speed of rotation of the rotary injector 222, 222.3, so that for a given speed of rotation, or range thereof, the shape of the aerodynamic profile 186 and the angle of attack α thereof can be adapted to provide for the necessary pressure gain $\Delta_P$ (or loss if negative) across the rotary injector 222, 222.3.

Referring to FIG. 23, a second embodiment of the second aspect of a gas turbine engine 10, 10.3 is illustrated incorporating a system using fuel 12 to cool the turbine 24 and the associated blades 26 thereof, in cooperation with the second embodiment of the second aspect of a rotary injector 222, 222.2 for injecting the resulting preheated fuel 12 into the combustion chamber 16 of the gas turbine engine 10. Generally, unless described otherwise, the elements illustrated in FIG. 23 correspond to like numbered elements illustrated in FIG. 18 in both structure and operation. FIG. 23 illustrates an environment comprising a radial-flow gas turbine engine 10, 10.3. In accordance with the second aspect, the gas turbine engine 10, 10.3 is operated at a sufficient level of power, and with associated sufficient levels of temperature in the associated exhaust gases 18.1, such that the fuel 12.4 flowing radially inwards into the first portion 74.1 of the second cavity 74, and thereafter until injection into the combustion chamber 16, is in a gaseous or vapor state as indicted by the locus of points labeled "X" on FIG. 4, and similarly indicated in FIG. 23, for which either the pressure at a given temperature is less than that of the "saturated liquid" boundary, or for which the temperature is greater than the critical temperature. The rotary injector 222, 222.2 is operatively coupled to the shaft 88 of the gas turbine engine 10 so as to rotate therewith, and so as to receive fuel 12.4 therefrom. The rotary injector 222, 222.2 comprises one or more arms 93 that are adapted to inject fuel 12.4 from at least one location along the trailing edge 146 thereof that is radially displaced from the shaft 88 so that the fuel 12.4 is injected into an annular region that is separated from the shaft 88. The fuel 12.4 flows from the first portion 74.1 of the second cavity 74, through the passage 90, into the shaft 88, through the interior 86 of the shaft 88, out of the second passage 94 through the shaft 88, into and through a fluid passage 97 in the arm 93 of the rotary injector 222, 222.2, and into the combustion chamber 16 through at least one first discharge orifice 224 in the trailing edge 146 of the arm 93, wherein, for example, the first embodiment of the rotary injector 222, 222.2 is illustrated in FIG. 23 comprising a single first discharge orifice 224 in the illustrated arm 93. The rotary injector 222, 222.2 cooperates with a duct 228 extending from a radially inboard boundary of the forward surface 196.1 of the combustion chamber 16.

In operation, a first portion 202.1 of the first portion 202 of the air 14 flows from the second annular plenum 204 through the duct 228, past the rotary injector 222, 222.2, and into the combustion chamber 16 after mixing with the fuel 12.4 injected from the first discharge orifices 224 on the trailing edge(s) 146 of the one or more arms 93 of the rotary injector 222, 222.2. Furthermore, in parallel, a second portion 202.2 of the first portion 202 of the air 14 from the second annular plenum 204 flows directly into the combustion chamber 16 through the one or more orifices 216 in the forward surface 196.1 of the combustion chamber 16. The pressure $P_0'$ of the first portion 202 of air 14 in the second annular plenum 204 would generally be less than the pressure $P_0$ as a result of frictional losses along the associated flow path. Similarly, the pressure $P_0''$ of the portion 206.1 of the second portion 206 of air 14 in the fourth annular plenum 212 would also generally be less than the pressure $P_0$ as a result of frictional losses along the associated flow path. The pressure $P_1$ upstream of the rotary injector 222, 222.2 is less than the pressure $P_0'$ as a result of frictional losses along the associated flow path from the second annular plenum 204 to the inlet of the rotary injector 222, 222.2, and as a result of the discharge of the second portion 202.2 of air 14 from the second annular plenum 204 directly into the combustion chamber 16 through the one or more orifices 216 in the forward surface 196.1 of the combustion chamber 16. The gas turbine engine 10, 10.2 is adapted so that the pressure $P_2$ in the combustion chamber 16 downstream of the rotary injector 222, 222.2 proximate to the aftward surface 196.3 of the combustion chamber 16 is less than the pressure $P_0''$ in the fourth annular plenum 212 by a sufficient amount so that a sufficient amount of air 14 flows from the fourth annular plenum 212 through the orifices 218 in the aftward surface 196.3 of the combustion chamber 16 into the combustion chamber 16 so as to provide for proper operation of the associated primary annular combustion zone 194, for example, the isolation thereof from the aftward surface 196.3 of the combustion chamber 16. The combustion chamber 16 of the gas turbine engine 10, 10.3 is adapted, e.g. shaped, so as to provide for circulation 242 within the primary annular combustion zone 194 downstream and proximate to the rotary injector 222, 222.2, and to provide for a principal component of flow 220 therefrom that is in a radial direction within the combustion chamber 16.

Referring to FIG. 24, a third embodiment of the second aspect of a gas turbine engine 10, 10.4 is illustrated incorporating a system using fuel 12 to cool the turbine 24 and the associated blades 26 thereof, in cooperation with the second embodiment of the second aspect of a rotary injector 222, 222.2 for injecting the resulting preheated fuel 12 into the combustion chamber 16 of the gas turbine engine 10. Generally, unless described otherwise, the elements illustrated in FIG. 23 correspond to like numbered elements illustrated in FIGS. 18 and 23 in both structure and operation. FIG. 24 illustrates an environment comprising a confined recirculation combustion (CRC) gas turbine engine 10, 10.4. In accordance with the second aspect, the gas turbine engine 10, 10.4 is operated at a sufficient level of power, and with associated sufficient levels of temperature in the associated exhaust gases 18.1, such that the fuel 12.4 flowing radially inwards into the first portion 74.1 of the second cavity 74, and thereafter until injection into the combustion chamber 16, is in a gaseous or vapor state as indicted by the locus of points labeled "X" on FIG. 4, and similarly indicated in FIG. 24, for which either the pressure at a given temperature is less than that of the "saturated liquid" boundary, or for which the temperature is greater than the critical temperature. The rotary injector 222, 222.2 is operatively coupled to the shaft 88 of the gas turbine engine 10 so as to rotate therewith, and so as to receive fuel 12.4 therefrom. The rotary injector 222, 222.2 comprises one or more arms 93 that are adapted to inject fuel 12.4 from at least one location along the trailing edge 146 thereof that is radially displaced from the shaft 88 so that the fuel 12.4 is injected into an annular region that is separated from the shaft 88. The fuel 12.4 flows from the first portion 74.1 of the second cavity 74, through the passage 90, into the shaft 88, through the interior 86 of the shaft 88, out of the second passage 94 through the shaft 88, into and through a fluid passage 97 in the arm 93 of the rotary injector 222, 222.2, and into the combustion chamber 16 through at least one first discharge orifice 224 in the trailing edge 146 of the arm 93, wherein, for example, the first embodiment of the rotary injector 222, 222.2 is illustrated in FIG. 24 comprising a single first discharge orifice 224 in the illustrated arm 93. The rotary injector 222, 222.2 cooperates with a duct 228 extending from a radially inboard boundary of the forward surface 196.1 of the combustion chamber 16. The duct 228 extends aftward beyond the rotary injector 222, 222.2 so as to form a radially inboard boundary 244 of an annular confined recirculation zone 246 of the combustion chamber 16. A first portion 248 of the aftward surface 196.3 of the combustion chamber 16 is curved in a first direction 250 so as to provide for reversing the flow of the air/fuel mixture 252 that is discharged from the duct 228. As used herein, the direction of curvature of a curved surface is defined by the "right-hand rule", i.e. by aligning the fingers of one's right hand, curling towards one's palm, along the curved surface and pointing along the curved surface in a direction leading out of the combustion chamber 16 or gas turbine engine 10, wherein the direction of curvature is then indicated by the direction of one's thumb when extended in a direction normal to one's fingers. A second portion 254 of the aftward surface 196.3 of the combustion chamber 16 abuts the first portion 248 thereof, and provides for a radially outboard boundary 256 of the annular confined recirculation zone 246. A third portion 258 of the aftward surface 196.3 of the combustion chamber 16 is recurved in a second direction 260, and the aftward surface 196.3 of the combustion chamber 16 extends afterward therefrom so as to form a radially inboard boundary 262 of an annular discharge zone 264 of the combustion chamber 16. The forward surface 196.1 of the combustion chamber 16 is curved in the second direction 260, extending from the radially inboard boundary 244 of the annular confined recirculation zone 246 and around the annular discharge zone 264 so as to provide for a radially outer boundary 266 thereof and a corresponding outer circumferential surface 196.2 of the combustion chamber 16. The first 248, second 254 and third 258 portions of the aftward surface 196.3 of the combustion chamber 16 form a forward boundary of the fourth annular plenum 212, and are each adapted with associated orifices 218 so as to provide for a discharge of air 14 from the fourth annular plenum 212 both into the annular confined recirculation zone 246 and into the annular discharge zone 264 of the combustion chamber 16. Similarly, the forward surface 196.1 of the combustion chamber 16 is adapted with associated orifices 216, 214 that provide for a discharge of air 14 from the second annular plenum 204 into the annular confined recirculation zone 246 and into the annular discharge zone 264, and from the third annular plenum 208 into the annular discharge zone 264.

In operation, a first portion 202.1 of the first portion 202 of the air 14 flows from the second annular plenum 204 through the duct 228, past the rotary injector 222, 222.2, and into the combustion chamber 16 as the air/fuel mixture 252 after mixing with the fuel 12.4 injected from the first discharge orifices 224 on the trailing edge(s) 146 of the one or more arms 93 of the rotary injector 222, 222.2. Furthermore, in parallel, a second portion 202.2 of the first portion 202 of the air 14 from the second annular plenum 204 flows directly into the annular confined recirculation zone 246 of the combustion chamber 16, and into the annular discharge zone 264 of the combustion chamber 16, through the one or more orifices 216 in the forward surface 196.1 of the combustion chamber 16. The pressure $P_0'$ of the first portion 202 of air 14 in the second annular plenum 204 would generally be less than the pressure $P_0$ as a result of frictional losses along the associated flow path. Similarly, the pressure $P_0''$ of the portion 206.1 of the second portion 206 of air 14 in the fourth annular plenum 212 would also generally be less than the pressure $P_0$ as a result of frictional losses along the associated flow path. The pressure $P_1$ upstream of the rotary injector 222, 222.2 is less than the pressure $P_0'$ as a result of frictional losses along the associated flow path from the second annular plenum 204 to the inlet of the rotary injector 222, 222.2, and as a result of the discharge of the second portion 202.2 of air 14 from the second annular plenum 204 directly into the combustion chamber 16 through the one or more orifices 216 in the forward surface 196.1 of the combustion chamber 16. The gas turbine engine 10, 10.4 is adapted so that the pressure $P_2$ in the combustion chamber 16 downstream of the rotary injector 222, 222.2 proximate to the aftward surface 196.3 of the combustion chamber 16 is less than the pressure $P_0''$ in the fourth annular plenum 212 by a sufficient amount so that a sufficient amount of air 14 flows from the fourth annular plenum 212 through the orifices 218 in the aftward surface 196.3 of the combustion chamber 16 into the combustion chamber 16 so as to provide for proper operation of the associated primary annular combustion zone 194, for example, the isolation thereof from the aftward surface 196.3 of the combustion chamber 16. More particularly, of the portion 206.1 of the second portion 206 of air 14 in the fourth annular plenum 212, a first portion 268 flowing radially outward and forward from the first portion 248 of the aftward surface 196.3 of the combustion chamber 16, a second portion 270 flowing radially inward and forward from the first portion 248 of the aftward surface 196.3 of the combustion chamber 16, and a third portion 272 flowing radially inward from the second portion 254 of the combustion chamber 16, cooperate with a first portion 274 of the second portion 202.2 of the first portion 202 of the air 14 flowing aftward from the second annular plenum 204, and cooperate with the flow of the air/fuel mixture 252 from the duct 228 flowing aftward into the annular confined recirculation zone 246, so as to provide for a circulation 242 of combustion gases 198 within the confined recirculation zone 246 of the combustion chamber 16, which also provides for a relatively compact primary annular combustion zone 194. Combustion gases 198 flowing from the confined recirculation zone 246 into the annular discharge zone 264 are further combined with a fourth portion 276 of the second portion 206 of air 14 in the fourth annular plenum 212 flowing radially outward from the radially inboard boundary 262 of an annular discharge zone 264 of the combustion chamber 16, and with a second portion 278 of the second portion 202.2 of the first portion 202 of the air 14 flowing aftward and radially inward from the second annular plenum 204, and the remaining portion 206.2 of the second portion 206 of air 14 in the third annular plenum 208 flowing generally radially inward into the annular discharge zone 264 of the combustion chamber 16. Exhaust gases 18.1 are then discharged from the annular discharge zone 264, past the at least one hollow vane 210, and then through the turbine 20 of the gas turbine engine 10, 10.4.

Referring to FIG. 25, a fourth embodiment of the second aspect of a gas turbine engine 10, 10.5 is illustrated incorporating a system using fuel 12 to cool the turbine 24 and the associated blades 26 thereof, in cooperation with a fourth embodiment of the second aspect of a rotary injector 222, 222.4 for injecting the resulting preheated fuel 12 into the combustion chamber 16 of the gas turbine engine 10, 10.5.

Generally, unless described otherwise, the elements illustrated in FIG. 25 correspond to like numbered elements illustrated in FIGS. 1 and 16, in both structure and operation. As with FIGS. 1 and 18, FIG. 25 illustrates an environment comprising an axial-flow gas turbine engine 10, 10.5. In accordance with the second aspect, the gas turbine engine 10, 10.5 is operated at a sufficient level of power, and with associated sufficient levels of temperature in the associated exhaust gases 18.1, such that the fuel 12.4 flowing radially inwards into the first portion 74.1 of the second cavity 74, and thereafter until injection into the combustion chamber 16, is in a gaseous or vapor state as indicted by the locus of points labeled "X" on FIG. 4, and similarly indicated in FIG. 25, for which either the pressure at a given temperature is less than that of the "saturated liquid" boundary, or for which the temperature is greater than the critical temperature. The rotary injector 222, 222.4 is operatively coupled to the forward cover 76 forming a bounding surface of the second cavity 74, so as to rotate therewith. At least one passage 280 provides for distributing fuel 12.4 from the second cavity 74 to at least one associated fluid passage 97 in one or more arms 93 of the rotary injector 222, 222.4 that are adapted to inject fuel 12.4 from at least one first discharge orifice 224 at at least one location along the trailing edge 146 thereof, into a primary annular combustion zone 194 within the combustion chamber 16 of the gas turbine engine 10, 10.5. For example, the at least one passage 280 could comprise an annular passage 280, or one or more axial passages 280.

In operation, the first portion 202 of the air 14 flows from the second annular plenum 204 directly into the combustion chamber 16 through the one or more orifices 216 in the forward surface 196.1 of the combustion chamber 16, then past the rotary injector 222, 222.4 where the air 14 is mixed with the fuel 12.4 injected from the at least one first discharge orifice 224 on the trailing edge(s) 146 of the one or more arms 93 of the rotary injector 222, 222.4. The pressure $P_0'$ of the first portion 202 of air 14 in the second annular plenum 204 would generally be less than the pressure $P_0$ as a result of frictional losses along the associated flow path. Similarly, the pressure $P_0''$ of the portion 206.1 of the second portion 206 of air 14 in the fourth annular plenum 212 would also generally be less than the pressure $P_0$ as a result of frictional losses along the associated flow path. The pressure $P_1$ upstream of the rotary injector 222, 222.4 is less than the pressure $P_0'$ as a result of frictional losses along the associated flow path from the second annular plenum 204 to the inlet of the rotary injector 222, 222.4, and as a result of the discharge of the first portion 202 of air 14 from the second annular plenum 204 directly into the combustion chamber 16 through the one or more orifices 216 in the forward surface 196.1 of the combustion chamber 16. The gas turbine engine 10, 10.5 is adapted so that the pressure $P_2$ in the combustion chamber 16 downstream of the rotary injector 222, 222.4 proximate to the aftward surface 196.3 of the combustion chamber 16 is less than the pressure $P_0'$ in the fourth annular plenum 212 by a sufficient amount so that a sufficient amount of air 14 flows from the fourth annular plenum 212 through the orifices 218 in the aftward surface 196.3 of the combustion chamber 16 into the combustion chamber 16 so as to provide for proper operation of the associated primary annular combustion zone 194, for example, the isolation thereof from the aftward surface 196.3 of the combustion chamber 16.

Heretofore, various embodiments of the rotary injector 222, 222.1, 222.2, 222.4 have been illustrated in cooperation with various embodiments of an associated gas turbine engine 10, 10.1, 10.2, 10.3, 10.4, 10.5, wherein the rotary injector 222, 222.1, 222.2, 222.4 is used to inject preheated fuel 12—in either liquid state 12.3, or a gaseous or vapor state 12.4—into the associated combustion chamber, wherein the fuel 12.3, 12.4 is preheated by cooling one or more associated blades 26 of a turbine 20 of the gas turbine engine 10, 10.1, 10.2, 10.3, 10.4, 10.5. However, a rotary injector 222 may also be adapted to inject fuel 12 that has either not been preheated, or which has been preheated but in a manner different from that illustrated hereinabove. For example, referring to FIG. 26, a second embodiment of the first aspect of a gas turbine engine 10, 10.6 is illustrated incorporating the same configuration of the combustion chamber 16, rotary injector 95 and associated system for delivering air 14 to the combustion chamber 16, as illustrated in FIG. 1, but for which the source of fuel 12 to the rotary injector 95 is generally a source of liquid fuel 12.1,—indicted by the locus of points labeled "Y" on FIG. 4, and similarly indicated in FIG. 26,— which either may or may not be preheated by cooling one or more blades 26' of a turbine 20 of the gas turbine engine 10, 10.6, wherein the turbine 20 is illustrated in cooperation with an associated forward cover 76', which either may or may not be used as a bounding surface for fuel 12 that is preheated by cooling the turbine 20, depending upon the embodiment. Generally, unless described otherwise, the elements illustrated in FIG. 26 correspond to like numbered elements illustrated in FIG. 1, in both structure and operation. Similarly, as another example, referring to FIG. 27, a fifth embodiment of the second aspect of a gas turbine engine 10, 10.7 is illustrated incorporating the same configuration of the combustion chamber 16, rotary injector 222, 222.1 and associated system for delivering air 14 to the combustion chamber 16, as illustrated in FIG. 18, but for which the source of fuel 12 to the rotary injector 222, 222.1 is generally a source of fuel 12.4 in a gaseous or vapor state—as indicted by the locus of points labeled "X" on FIG. 4, and similarly indicated in FIG. 27, for which either the pressure at a given temperature is less than that of the "saturated liquid" boundary, or for which the temperature is greater than the critical temperature,—which either may or may not be generated by cooling one or more blades 26' of a turbine 20 of the gas turbine engine 10, 10.7, wherein the turbine 20 is illustrated in cooperation with an associated forward cover 76', which either may or may not be used as a bounding surface for fuel 12 that is preheated by cooling the turbine 20, depending upon the embodiment.

Accordingly, whether or not the fuel 12 is preheated prior to the injection thereof into the combustion chamber 16, and if preheated, regardless of the method by which this occurs, the gas turbine engine 10 is adapted so as to provide for injecting fuel 12 into a combustion chamber 16 from an arm 93 of a rotary injector 222, wherein the arm 93 extends from a rotatable portion of the gas turbine engine 10 that when in operation rotates with the gas turbine engine 10, the fuel 12 is injected from at least one location 92, 224 on the arm 93 that is at a radial offset R with respect to the rotatable portion of the gas turbine engine 10, and the radial offset R is adapted to that an associated combustion zone 194 is substantially separated from the rotatable portion of the gas turbine engine 10. The gas turbine engine 10 is further adapted so as to provide for injecting a first portion 202 of air 14 into the combustion chamber 16 from at least one first location 216, 218 upstream of the rotary injector 222, wherein at least a portion of the first portion 202 of air 14 flows across the rotary injector 222; and injecting a second portion 206.1 of air 14 into the combustion chamber 16 from at least one second location 218 downstream of the rotary injector 222, wherein the second portion 206.1 of air 14 is supplied to the at least one second location 218 from a plenum 212; and the rotary injector 222 is adapted so that a pressure $P_2$ in the combustion chamber 16 proximate to the at least one second location 218 is less than an associated pressure $P_0"$ within the plenum 212, so as to provide for the second portion 206.1 of air 14 to flow from the plenum 212 into the combustion chamber 16 from the at least one second location 218.

Referring to FIGS. 28a-c, a fifth embodiment of the second aspect of a rotary injector 222, 222.5 is illustrated comprising an arm 93 that is similar to that of the second embodiment of the rotary injector 222, 222.2 illustrated in FIG. 19, except that the associated first discharge orifice 224 is located within a passage 282 that extends through the arm 93 from the leading edge 188 to trailing edge 146 thereof, and which provides for a flow of air 14 therethrough coaxial with the flow of fuel 12.4 this is discharged from the associated first discharge orifice 224, wherein, in another embodiment, the rotary injector 222, 222.5 is further provided with one or more helical swirl vanes 284 that provide for inducing swirl into a stream of air 14 flowing through the passage 282. In operation, a rotation of the rotary injector 222, 222.5 and the one or more arms 93 associated therewith causes a least a portion of the incoming stream of air 14 to flow through the passage 282. The air 14 flowing through the passage 282 is then mixed with the fuel 12.4 discharged from the first discharge orifice 224 so as to generate a resulting air/fuel mixture 252 downstream of the first discharge orifice 224, wherein the helical swirl vanes 284 would provide for enhancing the associated mixing process by swirling the incoming stream of air 14 within the passage 282 where the air 14 is mixed with the fuel 12.4 discharged from the associated first discharge orifice 224.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein the expression "A or B" is true if either A or B is true, or if both A and B are true. Accordingly, the particular arrangements disclosed are meant to be illustrative only and not limiting as to the scope of the invention, which is to be given the full breadth of the appended claims, and any and all equivalents thereof.

What is claimed is:

1. A method of operating a gas turbine engine, comprising:
   a. injecting at least a first portion of fuel into a combustion chamber from at least one arm of a rotary injector, wherein said at least one arm extends from a rotatable portion of the gas turbine engine that when in operation rotates with said gas turbine engine, said first portion of said fuel is injected from at least one location on said at least one arm that is at a radial offset with respect to said rotatable portion of said gas turbine engine, and said radial offset provides for substantially separating an associated combustion zone from said rotatable portion of said gas turbine engine;
   b. injecting a first portion of air into said combustion chamber from at least one first location upstream of said rotary injector, wherein said gas turbine engine is adapted so that at least a portion of said first portion of air flows across said rotary injector, and a radial extent by which said at least one arm extends from said rotatable portion is at least as great as a corresponding radial extent, relative to said rotatable portion, of at least one first location of said at least one first location; and
   c. injecting a second portion of said air into said combustion chamber from at least one second location downstream of said rotary injector, wherein said second portion of said air is supplied to said at least one second location from a second plenum, and said rotary injector is adapted so that a pressure in said combustion chamber proximate to said at least one second location is less than an associated pressure within said second plenum, so as to provide for said second portion of said air to flow from said second plenum into said combustion chamber from said at least one second location.

2. A method of operating a gas turbine engine as recited in claim 1, further comprising preheating said first portion of said fuel prior to the operation of injecting said first portion of said fuel into said combustion chamber.

3. A method of operating a gas turbine engine as recited in claim 2, wherein the operation of preheating said first portion of said fuel prior to the operation of injecting said first portion of said fuel into said combustion chamber comprises:
   a. supplying said first portion of said fuel to said rotatable portion of the gas turbine engine, wherein said rotatable portion comprises a rotor and at least one blade operatively coupled to or a part of said rotor; and
   b. cooling at least one of said rotor or at least one said at least one blade with said first portion of said fuel supplied to said rotatable portion of said gas turbine engine.

4. A method of operating a gas turbine engine as recited in claim 2, wherein the operation of preheating said first portion of said fuel prior to the operation of injecting said first portion of said fuel into said combustion chamber comprises:
   a. flowing said first portion of said fuel along at least one first flow path from a first side of a rotor of said gas turbine engine to a second side of said rotor;
   b. providing for thermosiphon flow of said first portion of said fuel within at least one second flow path, wherein said at least one second flow path is in fluid communication with said at least one first flow path, and said at least one second flow path is in thermal communication with at least one blade operatively coupled to or a part of said rotor; and
   c. said at least one first flow path is adapted so that said first portion of said fuel can flow therealong without necessarily flowing along said at least one second flow path.

5. A method of operating a gas turbine engine as recited in claim 2, wherein the operation of preheating said first portion of said fuel prior to the operation of injecting said first portion of said fuel into said combustion chamber comprises:
   a. rotating a rotor of the gas turbine engine;
   b. supplying at least a first portion of said first portion of said fuel to a first cavity on or adjacent to a first side of said rotor of said gas turbine engine, wherein said first cavity rotates with said rotor;
   c. causing said first portion of said fuel supplied to said first cavity to rotate with said first cavity, whereby the rotation of said first portion of said fuel generates a centrifugal acceleration that acts upon said first portion of said fuel in said first cavity;
   d. flowing said first portion of said fuel through a first opening on said first side of said rotor and into a first flow path;
   e. flowing said first portion of said fuel from said first flow path into a second flow path, wherein said second flow path extends into a blade operatively coupled to or a part of said rotor, and the operations of flowing said first portion of said fuel into said first flow path and from said first flow path into said second flow path are responsive to said centrifugal acceleration;
   f. transferring heat from said blade to said first portion of said fuel in either said first flow path or said second flow path so as to generate a relatively-heated fluid therein;
   g. flowing said relatively heated fluid from said second flow path to said first flow path by a thermosiphon process whereby said relatively-heated fluid is replaced with a relatively-less-heated fluid within said second flow path; and
   h. flowing said relatively-heated fluid from said first flow path through a second opening on a second side of said rotor to a second cavity on or adjacent to said second side of said rotor.

6. A method of operating a gas turbine engine as recited in claim 1, wherein said first portion of said fuel is injected radially outwards into said combustion chamber in a liquid state from at least one port on said at least one arm.

7. A method of operating a gas turbine engine as recited in claim 6, further comprising isolating a pressure of a source of said fuel at at least one inlet to said at least one arm, from a pressure within said combustion chamber, wherein said at least one inlet is in fluid communication with said at least one port.

8. A method of operating a gas turbine engine as recited in claim 1, further comprising injecting a second portion of said fuel into said combustion chamber from a separate rotary injector within said combustion chamber.

9. A method of operating a gas turbine engine as recited in claim 1, wherein said first portion of said fuel is injected in an at least partially axially-aftward direction into said combustion chamber from at least one fluid passage oriented in said at least partially axially-aftward direction.

10. A method of operating a gas turbine engine as recited in claim 1, wherein said first portion of said air is supplied from a first plenum adjacent to and forward of said combustion chamber, a wall of said combustion chamber adjacent to said first plenum comprises a plurality of first orifices, and said plurality of first orifices provide for injecting at least a portion of said first portion of said air into said combustion chamber.

11. A method of operating a gas turbine engine as recited in claim 1, wherein said second plenum is adjacent to and aftward of said combustion chamber, a wall of said combustion chamber adjacent to said second plenum comprises a plurality of second orifices, and said plurality of second orifices provide for injecting at least a portion of said second portion of said air into said combustion chamber.

12. A method of operating a gas turbine engine as recited in claim 10, wherein said first plenum and said second plenum are supplied from a common source of said air.

13. A method of operating a gas turbine engine as recited in claim 12, wherein said second portion of said air is supplied to said second plenum from said common source of said air through an interior of a hollow vane extending though an exhaust duct of the gas turbine engine, and said exhaust duct is in fluid communication with said combustion chamber, further comprising discharging exhaust gases from said combustion chamber through said exhaust duct and directing a flow of said exhaust gases with an exterior surface of said hollow vane.

14. A method of operating a gas turbine engine as recited in claim 1, further comprising generating combustion gases within said combustion chamber, wherein said combustion chamber is adapted so that an overall flow of said combustion gases within said combustion chamber is principally in an axial direction.

15. A method of operating a gas turbine engine as recited in claim 1, further comprising generating combustion gases within said combustion chamber, wherein said combustion chamber is adapted so that an overall flow of said combustion gases within said combustion chamber is principally in a radial direction.

16. A method of operating a gas turbine engine as recited in claim 1, further comprising generating combustion gases within said combustion chamber, wherein said combustion chamber is adapted so that an overall flow of said combustion gases within said combustion chamber exhibits a substantial amount of circulation within said combustion chamber.

17. A method of operating a gas turbine engine, comprising:
  a. injecting at least a first portion of fuel into a combustion chamber from at least one arm of a rotary injector, wherein said at least one arm extends from a rotatable portion of the gas turbine engine that when in operation rotates with said gas turbine engine, said first portion of said fuel is injected from at least one location on said at least one arm that is at a radial offset with respect to said rotatable portion of said gas turbine engine, said radial offset provides for substantially separating an associated combustion zone from said rotatable portion of said gas turbine engine, said first portion of said fuel is injected radially outwards into said combustion chamber in a liquid state from at least one port on said at least one arm, at least one said at least one said port is located at an intermediate radial location along a trailing edge of said at least one arm, and said trailing edge of said at least one arm is adapted so as to prevent an attachment to said trailing edge of a substantial portion of said fuel injected from said at least one said at least one said port following injection of said fuel from said at least one ports;
  b. injecting a first portion of air into said combustion chamber from at least one first location upstream of said rotary injector, wherein said gas turbine engine is adapted so that at least a portion of said first portion of air flows across said rotary injector; and
  c. injecting a second portion of said air into said combustion chamber from at least one second location downstream of said rotary injector, wherein said second portion of said air is supplied to said at east one second location from a second plenum, and said rotary injector is adapted so that a pressure in said combustion chamber proximate to said at least one second location is less than an associated pressure within said second plenum, so as to provide for said second portion of said air to flow from said second plenum into said combustion chamber from said at least one second location.

18. A method of operating a gas turbine engine as recited in claim 17, wherein said at least one arm comprises at least one land stepped into said trailing edge of said at least one arm, and said at least one said at least one said port is located on said at least one said land.

19. A method of operating a gas turbine engine as recited in claim 18, wherein at least one said land is sloped in a radially increasing direction away from a riser surface of said trailing edge of said at least one arm.

20. A method of operating a gas turbine engine as recited in claim 17, wherein said at least one arm comprises at least one groove on said trailing edge, and said at least one groove is located radially outwards of a corresponding said at least one said port along said trailing edge.

21. A method of operating a gas turbine engine, comprising:
  a. injecting at least a first portion of fuel into a combustion chamber from at least one arm of a rotary injector, wherein said at least one arm extends from a rotatable portion of the gas turbine engine that when in operation rotates with said gas turbine engine, said first portion of said fuel is injected from at least one location on said at least one arm that is at a radial offset with respect to said rotatable portion of said as turbine engine, said radial offset provides for substantially separating an associated combustion zone from said rotatable portion of said gas turbine engine, and said first portion of said fuel is injected into said combustion chamber in a gaseous or vapor state from at least one port on said at least one arm;
  b. injecting a first portion of air into said combustion chamber from at least one first location upstream of said rotary injector, wherein said gas turbine engine is adapted so that at least a portion of said first portion of air flows across said rotary injector; and
  c. injecting a second portion of said air into said combustion chamber from at least one second location downstream of said rotary injector, wherein said second portion of said air is supplied to said at least one second location from a second plenum, and said rotary injector is adapted so that a pressure in said combustion chamber proximate to said at least one second location is less than an associated pressure within said second plenum, so as to provide for said second portion of said air to flow from said second plenum into said combustion chamber from said at least one second location.

22. A method of operating a gas turbine engine as recited in claim 21, wherein said at least one port comprises a plurality of ports at corresponding different radial locations on said at least one arm.

23. A method of operating a gas turbine engine, comprising:
  a. injecting at least a first portion of fuel into a combustion chamber from at least one arm of a rotary injector, wherein said at least one arm extends from a rotatable portion of the gas turbine engine that when in operation rotates with said gas turbine engine, said first portion of said fuel is injected from at least one location on said at least one arm that is at a radial offset with respect to said rotatable portion of said gas turbine engine, said radial offset provides for substantially separating an associated combustion zone from said rotatable portion of said gas turbine engine, said at least one arm is operative within a surrounding duct extending from a forward surface of said combustion chamber of said gas turbine engine, and at least a portion of said first portion of said air is supplied through said surrounding duct;
  b. injecting a first portion of air into said combustion chamber from at least one first location upstream of said rotary injector, wherein said gas turbine engine is adapted so that at least a portion of said first portion of air flows across said at least one arm of said rotary injector within said surrounding duct; and
  c. injecting a second portion of said air into said combustion chamber from at least one second location downstream of said rotary injector, wherein said second portion of said air is supplied to said at least one second location from a second plenum, and said rotary injector is adapted so that a pressure in said combustion chamber proximate to said at least one second location is less than an associated pressure within said second plenum, so as to provide for said second portion of said air to flow from said second plenum into said combustion chamber from said at least one second location.

24. A method of operating a gas turbine engine, comprising:
  a. injecting at least a first portion of fuel into a combustion chamber from at least one arm of a rotary injector, wherein said at least one arm extends from a rotatable portion of the gas turbine engine that when in operation rotates with said gas turbine engine, said first portion of said fuel is injected from at least one location on said at least one arm that is at a radial offset with respect to said rotatable portion of said gas turbine engine, said radial offset provides for substantially separating an associated combustion zone from said rotatable portion of said gas turbine engine, said at least one arm comprises an aerodynamic profile, and at least one of said aerodynamic profile or an orientation of said aerodynamic profile with respect to an axis of said gas turbine engine is adapted so that said at least one arm acts to extract work from said air flowing across said rotary injector;

b. injecting a first portion of air into said combustion chamber from at least one first location upstream of said rotary injector, wherein said gas turbine engine is adapted so that at least a portion of said first portion of air flows across said rotary injector; and c. injecting a second portion of said air into said combustion chamber from at least one second location downstream of said rotary injector, wherein said second portion of said air is supplied to said at least one second location from a second plenum, and said rotary injector is adapted so that a pressure in said combustion chamber proximate to said at least one second location is less than an associated pressure within said second plenum, so as to provide for said second portion of said air to flow from said second plenum into said combustion chamber from said at least one second location.

* * * * *

UNITED STATES PATENT AND TRADEMARK OFFICE
CERTIFICATE OF CORRECTION

PATENT NO.        : 8,763,405 B2
APPLICATION NO.   : 12/937197
DATED             : July 1, 2014
INVENTOR(S)       : John Sordyl and Jamey J. Condevaux It is certified that error appears in the above-identified patent and that said Letters Patent is hereby corrected as shown below:

Title page, Line 8 of Item (57), Abstract: "$P_0$" should be changed to --$P_0$"--.

Claims

Column 6, Line 23, Claim 9, "20/bladed" should be changed to --20 / bladed--.

Column 25,
    Line 31, Claim 17, "at least one ports" should be changed to --at least one port--; and
    Line 40, Claim 17, "east" should be changed to --least--.

Column 26, Line 4, Claim 21, "as turbine" should be changed to --gas turbine--.

Signed and Sealed this
Tenth Day of November, 2015

Michelle K. Lee
*Director of the United States Patent and Trademark Office*